United States Patent
Shrader et al.

(10) Patent No.: US 8,820,717 B2
(45) Date of Patent: Sep. 2, 2014

(54) SYSTEM AND METHOD FOR PLACING A TARPAULIN OVER A LOAD

(71) Applicant: TIN Inc., Memphis, TN (US)

(72) Inventors: Gaylon Bruce Shrader, McEwen, TN (US); Richard L Spinks, TN Ridge, TN (US); Willie R Hooper, McEwen, TN (US); James R O'Neal, Erin, TN (US)

(73) Assignee: TIN Inc., Memphis, TN (US)

( * ) Notice: Subject to any disclaimer, the term of this patent is extended or adjusted under 35 U.S.C. 154(b) by 0 days.

(21) Appl. No.: 13/661,860

(22) Filed: Oct. 26, 2012

(65) Prior Publication Data

US 2014/0117296 A1    May 1, 2014

(51) Int. Cl.
  *B66D 1/00*   (2006.01)

(52) U.S. Cl.
  USPC ............................. 254/324; 254/281; 254/326

(58) Field of Classification Search
  CPC ............ B60P 1/52; B60P 7/0876; B60P 1/36; B61D 3/20; B60J 7/085
  USPC .......... 254/323–328, 278, 280, 281, 283–286
  See application file for complete search history.

(56) References Cited

U.S. PATENT DOCUMENTS

| | | | | | |
|---|---|---|---|---|---|
| 2,671,414 | A | * | 3/1954 | Moe .................................. | 104/5 |
| 3,236,400 | A | * | 2/1966 | Turturro et al. ................ | 414/542 |
| 3,335,573 | A | * | 8/1967 | Ward ............................ | 405/282 |
| 3,499,498 | A | * | 3/1970 | Bromell et al. ................. | 175/52 |
| 3,501,027 | A | * | 3/1970 | Dea et al. ...................... | 414/542 |
| 3,801,070 | A | * | 4/1974 | Piasecki ........................ | 254/285 |
| 3,973,679 | A | * | 8/1976 | Hass et al. ..................... | 212/288 |
| 3,977,719 | A | * | 8/1976 | Thurston ......................... | 296/98 |
| 4,050,734 | A | * | 9/1977 | Richard .......................... | 296/98 |
| 4,236,859 | A | * | 12/1980 | Stearn et al. .................. | 414/460 |
| 4,316,696 | A | * | 2/1982 | Hoyerman .................... | 414/542 |
| 4,573,856 | A | * | 3/1986 | Meyer et al. .................. | 414/561 |
| 4,861,218 | A | * | 8/1989 | Lamer ........................... | 414/461 |
| 4,927,317 | A | * | 5/1990 | Acosta .......................... | 414/724 |
| 4,991,522 | A | * | 2/1991 | Alexander ..................... | 111/200 |
| 5,037,152 | A | * | 8/1991 | Hendricks ......................... | 296/3 |
| 5,240,303 | A | * | 8/1993 | Hageman ....................... | 296/98 |
| 5,304,014 | A | * | 4/1994 | Slutz ........................... | 405/129.9 |
| 5,498,057 | A | * | 3/1996 | Reina et al. ............... | 296/100.12 |
| 5,713,712 | A | * | 2/1998 | McIntyre ....................... | 414/328 |
| 5,743,700 | A | * | 4/1998 | Wood et al. ................... | 414/498 |
| 5,743,702 | A | * | 4/1998 | Gunderson .................... | 414/542 |

(Continued)

FOREIGN PATENT DOCUMENTS

WO      0119680      3/2001

*Primary Examiner* — Emmanuel M Marcelo
*Assistant Examiner* — Michael Gallion
(74) *Attorney, Agent, or Firm* — Matthew M. Eslami

(57) ABSTRACT

A system is mounted onto a forklift truck for covering and/or uncovering a cargo with a tarpaulin. The system comprises a tube frame assembly having a telescoping frame slidably attached to it. The telescoping frame is configured to be capable of being extendable and/or retractable within the tube frame assembly. The telescoping frame comprises a plurality of rollers configured to be capable of rotating when engaged with the plurality of flexible members and the flexible cover. A powertrain device is installed onto the tube frame assembly for causing to retract and/or to extend the telescoping frame within the tube frame assembly. A winch assembly is configured to be coupled to the tube frame assembly and having a plurality of straps engaged with the tarpaulin to cover and/or uncover the cargo.

38 Claims, 20 Drawing Sheets

(56) References Cited

U.S. PATENT DOCUMENTS

| | | | |
|---|---|---|---|
| 5,829,818 A * | 11/1998 | O'Daniel | 296/98 |
| 5,964,236 A * | 10/1999 | Berke | 135/87 |
| 6,241,048 B1 * | 6/2001 | Heilmann | 187/263 |
| 6,273,401 B1 * | 8/2001 | Payne | 254/266 |
| 6,347,826 B1 * | 2/2002 | Horner et al. | 296/98 |
| 6,502,709 B1 * | 1/2003 | Parker | 212/328 |
| 6,513,856 B1 * | 2/2003 | Swanson et al. | 296/98 |
| 6,634,850 B2 * | 10/2003 | Christensen | 414/607 |
| 6,811,202 B2 * | 11/2004 | Hornady | 296/100.01 |
| 6,824,189 B1 * | 11/2004 | Crabb | 296/100.01 |
| 7,413,394 B2 * | 8/2008 | Risser | 414/542 |
| 7,530,622 B2 * | 5/2009 | Hartman et al. | 296/100.16 |
| 7,819,262 B1 * | 10/2010 | Ewan | 212/325 |
| 8,006,956 B2 * | 8/2011 | Payne | 254/286 |
| 8,464,974 B2 * | 6/2013 | Schillo | 242/557 |
| 8,534,592 B2 * | 9/2013 | Payne | 242/557 |
| 2002/0149225 A1 * | 10/2002 | Hornady | 296/100.01 |
| 2003/0026681 A1 | 2/2003 | Christensen | |
| 2003/0090124 A1 * | 5/2003 | Nolan et al. | 296/98 |
| 2004/0046161 A1 * | 3/2004 | Payne | 254/266 |
| 2006/0163904 A1 | 7/2006 | Hartman et al. | |
| 2007/0013004 A1 * | 1/2007 | Payne | 257/368 |
| 2007/0132268 A1 * | 6/2007 | Bromberek | 296/98 |
| 2008/0129074 A1 * | 6/2008 | Hartman et al. | 296/100.16 |
| 2008/0224110 A1 * | 9/2008 | Starks et al. | 254/264 |
| 2009/0289142 A1 * | 11/2009 | Payne | 242/564 |
| 2010/0059619 A1 * | 3/2010 | Schillo | 242/388.6 |
| 2010/0283285 A1 * | 11/2010 | Cramaro et al. | 296/98 |
| 2011/0000865 A1 * | 1/2011 | Jung et al. | 212/73 |
| 2012/0001010 A1 * | 1/2012 | Payne | 242/390.2 |
| 2012/0187232 A1 * | 7/2012 | Molen | 242/557 |

* cited by examiner

SYSTEM AND METHOD FOR PLACING A TARPAULIN OVER A LOAD

FIELD OF THE INVENTION

This invention relates generally to a system and method for placing a flexible material over a load, and more specifically, to a mobile tarping system adapted to be mounted onto a forklift or other platforms, which is used to place a tarpaulin over an elevated load, such as a flatbed truck.

BACKGROUND OF THE INVENTION

It is generally a common practice to drape a tarp/tarpaulin or similar flexible cover over a load placed, for example, on a flatbed truck or on a railroad car to protect the load during transportation from external elements such as road debris, weather conditions, temperature changes and the like. Tarping of flatbed trucks generally requires the driver to position himself/herself on top of an outbound load in order to roll-out and position the tarps. In many cases, the load is not even on the flatbed and when combined with the height of up to 8 feet above the trailer surface, the work conditions present opportunities for life threatening falls and injuries. The use of tarp raising or hoisting system is recognized as a way to prevent the need for working on top of the load. The prior art tarping systems available in the market are stationary in the sense that a structure has a hoist device attached to it and the structure cannot be moved. While the stationary tarping stations are effective in assisting with the tarping of a load on the flatbeds, its use is limited to the location of the station. During inclement weather the truck would need to be tarped inside, prior to exiting the building. If the station is located outside, then it is of no value in inclement weather. Since most facilities have multiple shipping bays, a tarping station would need to be added to each bay. The building's structure in most facilities is suited for carrying the original roof load and is not designed for additional attachments, especially hoists. Thus, considerable structural additions are needed to add tarping stations within a facility.

Therefore, there is a need for a system and method that permits placing a tarp over a bulky object, such as a load on a flatbed truck, that would eliminate the need for manual labor to climb on the flatbed of the truck and it is also safe, quick and can be used inside or outside of a building and does not require a substantial amount of labor.

SUMMARY OF THE INVENTION

The present invention is directed to a system and method that provides a means of placing a tarp/tarpaulin over loads, such as on a flatbed truck and eliminates the need for drivers or other persons to work on top of the loads while significantly reducing capital expenditures associated with multiple tarping stations and structural additions. The present invention is a mobile tarping system attached to a forklift truck or other mobile lifting devices and is easily maneuverable to be transported to the load. The mobile tarping system is compact in construction, relatively inexpensive as compared to a conventional tarping station and may be used inside or outside of a building at any location without special consideration or additional expenses.

The system is equipped with a winch assembly powered by an electric battery. Alternatively, the winch assembly may be powered by other means such as hydraulics and/or pneumatic and/or the likes. In the preferred embodiment of the invention, four "tie down" type straps are attached to the winch assembly for lifting of the tarp/tarpaulin; however, depending on the size of the system, different number of straps may be used. Preferably using wireless remote controls, the winch assembly can be controlled by the lift truck driver or the by the attendant that attaches the straps to the tarp. Once installed on the lift truck, the system operates with a width (w) that corresponds to the standard tarp width and is retractable to a much smaller foot-print for ease of transportation and storage when not in use. The process of tarping a load with this system can be easily and safely performed with one person due to the wireless remote capability. However, in high volume tarping applications, the time to tarp a load can be significantly decreased by using a driver operator and an attendant who positions and connects the tarp to the straps on the device.

The mobile tarping system is constructed to raise and store approximately ⅓ of the tarp/tarpaulin in a horizontal plane in order to minimize lifting requirements. Lifting height restrictions may be critical in many enclosed structures and may be of concern even in outside environment applications where prevailing winds could create lift truck stability issues. The system can be easily modified, by the addition of stationary uprights, pedestal mounting or roller storage, to further reduce lift truck lifting height restrictions if warranted. As noted above, the winch assembly may be powered by means other than electric, such as a direct connection to the lift trucks hydraulic output. The system uses four lifting straps that are manually connected to or disconnected from the tarp. Cables, ropes, mechanical swing arms, etc. could be used to hoist the tarp and alternate connectors, instead of hooks, could be employed to connect the tarp to the system. Quick connect, remote operated connecting mechanisms are contemplated that allow less operator involvement and reduce the time required to tarp a load. The system can be used in any situation that requires freight to be placed on a flatbed trailer or the like and tarped for transportation. The system is readily useable by existing facilities providing that the facilities have some type of mobile equipment (e.g., forklift) that is capable being fitted with this attachment.

Accordingly, one aspect of the present invention is directed to a system mounted onto a movable lifting vehicle for wrapping and/or unwrapping a cargo with a flexible cover such as a tarp or tarpaulin. The system comprises a tube frame assembly having a telescoping frame slidably attached thereto. The tube frame assembly comprises a first pair of guide swing arms each of which is coupled on opposed sides of the tube frame assembly and wherein each of the guide swing arms is engaged with the plurality of the flexible members. The telescoping frame is configured to be capable of being extendable and/or retractable within the tube frame assembly. The telescoping frame comprises a plurality of rollers configured to be capable of rotating when engaged with the plurality of flexible members and the flexible cover. The plurality of rollers is defined by two identical outer rollers and a center roller wherein each of the rollers is coupled to the telescoping frame. The telescoping frame comprises a second pair of guide swing arms each of which is coupled on opposed sides of the tube frame assembly and wherein each of the guide swing arms is engaged with the plurality of the flexible members. A winch assembly is configured to be coupled to the tube frame assembly and having a plurality of flexible members engaged with the flexible cover to wrap and/or unwrap the cargo. The plurality of flexible members is selected from a group consisting of straps, cable, ropes and mechanical swing arms. The winch assembly includes a gear housing assembly, a gear mounting plate, four pin rods, a winch motor housing assembly, an end plate, a drum assembly, and four spacer plates which are interconnect to one another. The winch assembly is electronically operated by two electric batteries. Alternatively, the winch assembly may be electronically operated by the movable lifting vehicle. Each of the guide swing arms is coupled with a respective hydraulic cylinder that causes to swing the guide swing arms with respect to the tube frame assembly and/or telescoping frame. Each of the first and second pairs of the guide swing arms includes a respective strap guide spool attached at respective free ends thereof to engage with the respective straps. The system further comprises a powertrain device having a hydraulic motor assembly, a plurality of chains, a cross shaft assembly, two idler sprocket assemblies, a top cam follower guide, a bottom cam follower guide, a side cam follower guide, and a front cam follower guide which are interconnect to one another to cause the telescoping frame extend and/or retract within the tube frame assembly during operation of the system.

Another aspect of the present invention is directed to a system mounted onto a forklift truck for covering and/or uncovering a cargo with a tarpaulin. The system comprises a tube frame assembly having a telescoping frame slidably attached thereto. The telescoping frame is configured to be capable of being extendable and/or retractable within the tube frame assembly. Each of the respective tube frame assembly and the telescoping frame is defined by respective two parallel spaced apart longitudinal tube bars that are interconnected at their respective ends with a respective cross bar. A powertrain device is installed onto the tube frame assembly for causing to retract and/or extend the telescoping frame within the tube frame assembly. A winch assembly is configured to be coupled to the tube frame assembly and having a plurality of straps engaged with the tarpaulin to cover and/or uncover the cargo. The winch assembly includes a gear housing assembly, a gear mounting plate, four pin rods, a winch motor housing assembly, an end plate, a drum assembly, and four spacer plates which are interconnect to one another. The four spacer plates are coupled to the drum assembly in spaced apart from one another in parallel manner and wherein each of the straps positioned between the four spacer plates. The plurality of straps is defined by four identical straps which are rotatably engaged with the winch assembly in a manner that two of the straps travel in one direction and the other two straps travel in opposite direction during operation of the system.

A further aspect of the present invention is directed to a system mounted onto a forklift truck for covering and/or uncovering a cargo with a tarpaulin. The system comprises a tube frame assembly having a tray frame attached therein. A plurality of guide swing arms being outwardly extend from each corner of tube frame assembly and are capable of being extendable and/or retractable within the tube frame assembly. The plurality of guide swing arms is four guide swing arms. The tube frame assembly comprises two identical outer rollers and a center roller wherein each of the two outer rollers is coupled to the respective two of the guide swing arms and the center roller is coupled to one of the four tube bar. A winch assembly is configured to be coupled to the tube frame assembly and having a plurality of straps engaged with the tarpaulin to cover and/or uncover the cargo. The plurality of straps is defined by four identical straps which are rotatably engaged with the winch assembly in a manner that two of the straps travel in one direction and the other two straps travel in opposite direction during operation of the system. The tube frame assembly is defined by four spaced apart tubes bars that are interconnected at their respective ends to form a substantially squarely shaped tube frame. The tray frame comprises a center tube bar, two longitudinal tube slots, and a transverse tube bar in which the two longitudinal tube slots and the transverse bar are all parallel with one another. The respective longitudinal tube slots are positioned spaced apart from one another and are attached at one respective ends to one of the four tube bars and the other respective ends are attached to the center tube bar. The respective longitudinal tube slots are each sized to receive the forks of the forklift truck. The transverse bar is attached at one end to the center tube bar and at the opposed end to one of the four tube bars.

A further aspect of the present invention is directed to a method of covering a cargo with a tarpaulin placed on a flatbed of a trailer using a forklift truck. The method comprises the steps of mounting a system onto the fork lift truck for applying the tarpaulin over the cargo by extending outwardly the telescoping frame from the tube frame assembly so that a plurality of flexible members are pulling up the tarpaulin and placing the tarpaulin over the cargo. The system comprises a tube frame assembly having a telescoping frame slidably attached thereto. The telescoping frame is configured to be capable of being extendable and/or retractable within the tube frame assembly. A winch assembly is configured to be coupled to the tube frame assembly and having a plurality of flexible members engaged with the flexible cover to wrap and/or unwrap the cargo. Next, attaching the plurality of flexible members to the tarpaulin and lifting the tarpaulin by maneuvering the system and placing the tarpaulin over the cargo.

BRIEF DESCRIPTION OF THE DRAWINGS

Certain details in the drawings are set forth below to provide a sufficient understanding of embodiments of the invention. However, it will be clear to one skilled in the art that embodiments of the invention may be practiced without several of these particular details. For example, well-known features of forklift trucks, winches, hydraulic cylinder, circuits, control signals, computing components, and software operations have not been shown in detail in order to avoid unnecessary obscuring the described embodiments of the invention. The foregoing aspects and other features of the invention are explained in the following description, taken in connection with the accompanying drawings where.

DETAILED DESCRIPTION OF THE INVENTION

Figure 1:
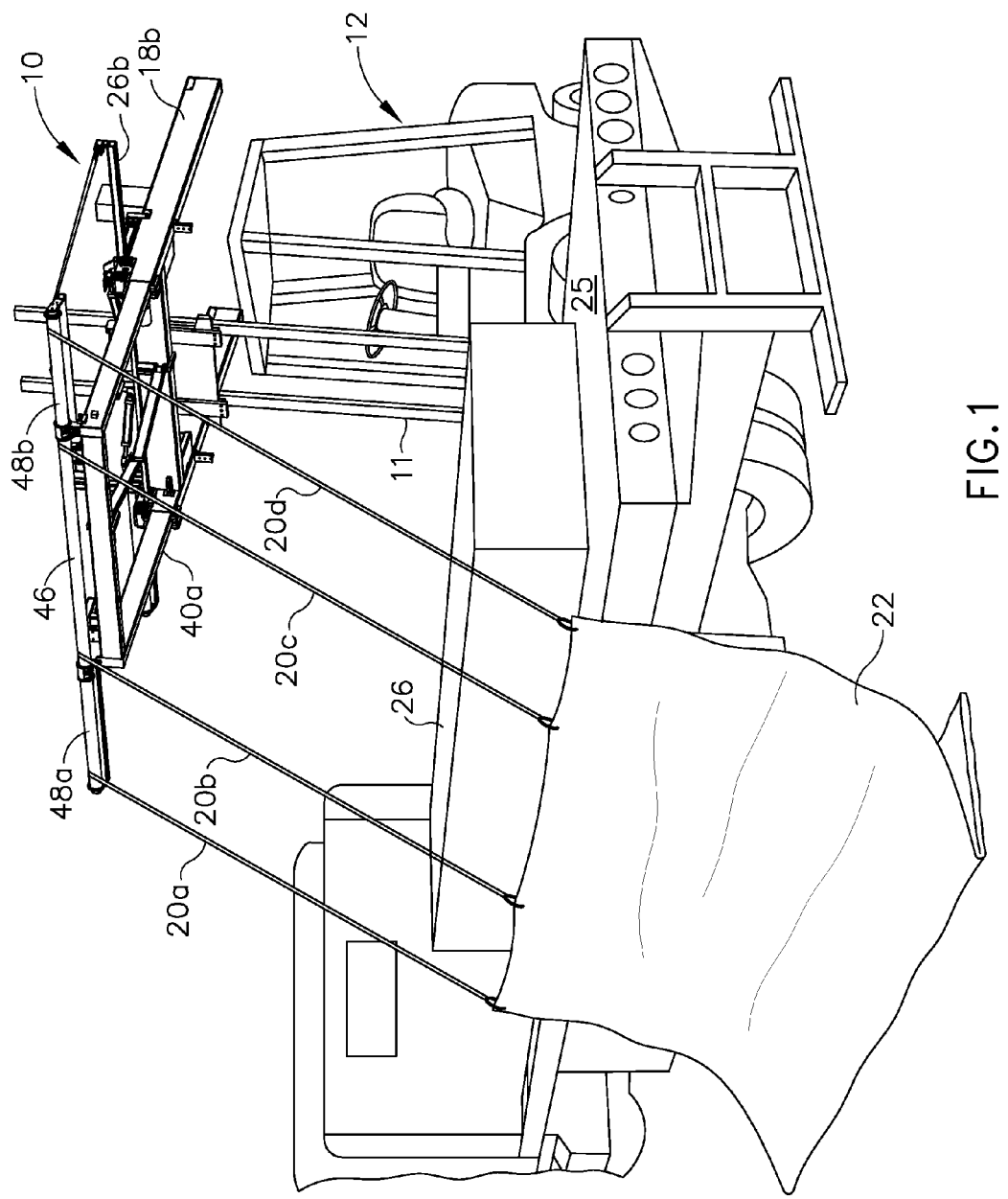
FIG. 1 is a perspective view of a system mounted on a forklift truck and illustrating the operation of system in placing a tarp/tarpaulin over a load in accordance to the preferred embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
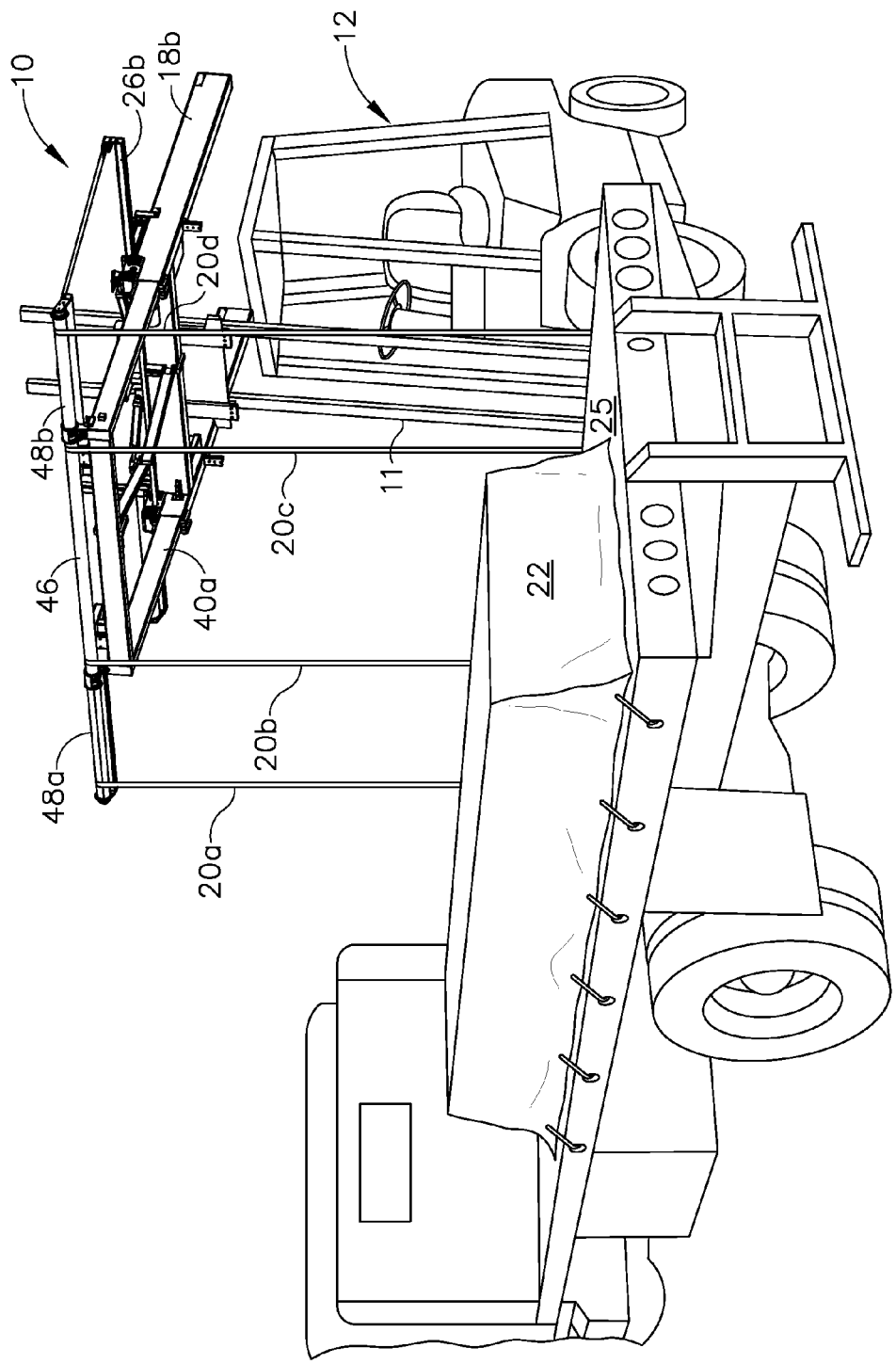
FIG. 2 is similar to FIG. 1, illustrating the load is fully-wrapped by the tarp/tarpaulin using the system made in accordance to the present invention.

FIG. 1 is a perspective view of a mobile tarping system 10 mounted on a transporting and lifting vehicle, such as a forklift truck 12 used to cover a load 26 with a tarp/tarpaulin 22 and FIG. 2 illustrates that the load 26 is fully-wrapped with the tarp/tarpaulin 22 on a flatbed trailer 25 by way of illustrated mobile tarping system 10. The mobile tarping system 10 is constructed to raise and store approximately ⅓ of the tarp/tarpaulin 22 in a horizontal plane in order to minimize lifting requirements. Although the ⅓ of the tarp/tarpaulin 22 in a horizontal plane is not required for operation of the system 10, but, as one of ordinary skill in art would appreciate the ⅓ of the tarp/tarpaulin 22 in a horizontal plane is preferred. Lifting height restrictions may be critical in many enclosed structures and may be of concern even in outside environment applications where prevailing winds could create lift truck stability issues. The system 10 can be easily modified, by the addition of stationary uprights, pedestal mounting or roller storage, to further reduce lift truck lifting height restrictions if warranted. The system 10 uses four lifting straps 20a, 20b, 20c, and 20d that are manually connected to or disconnected from the tarp. In the preferred embodiment of the invention, four lifting straps 20a, 20b, 20c, and 20d are used, but any number of lifting straps can be used as well. Cables, ropes, mechanical swing arms, etc. could be used to hoist the tarp 22 and alternate connectors, instead of hooks, could be employed to connect the tarp to the system. Quick connect, remote operated connecting mechanisms are contemplated that allow less operator involvement and reduce the time required to tarp the load 26. The system 10 can be used in any situation that requires freight to be placed on the flatbed trailer 25 and tamed for transportation. The system 10 is readily useable by existing facilities providing that the facilities have some type of mobile equipment (e.g., forklift) that is capable of being fitted with this attachment.

Figure 3A:
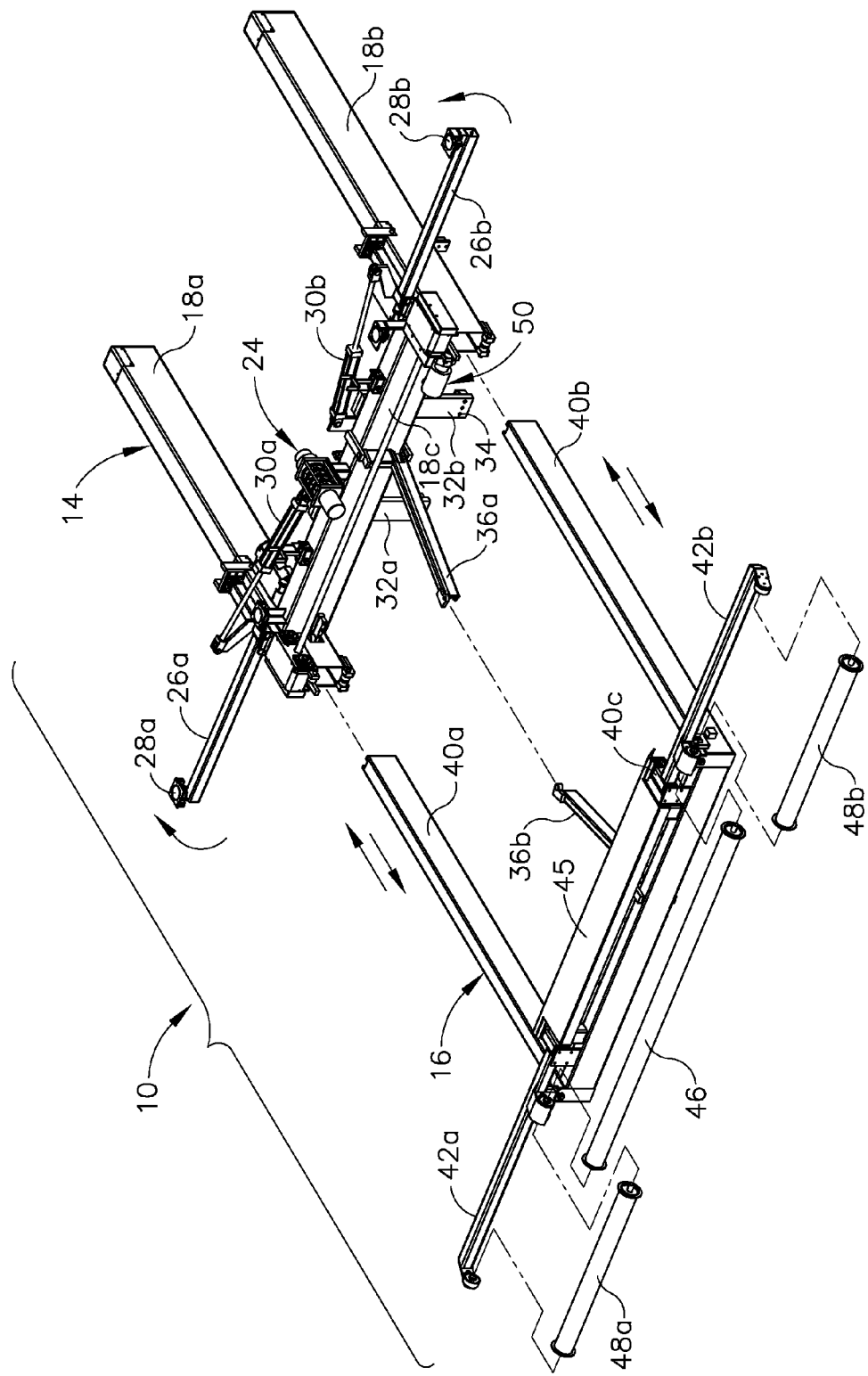
FIG. 3A is an exploded perspective view of the system in FIGS. 1 and 2 without the forklift truck wherein the system defined by a tube frame assembly and a telescoping frame in accordance to the preferred embodiment of the invention.
Figure 3B:
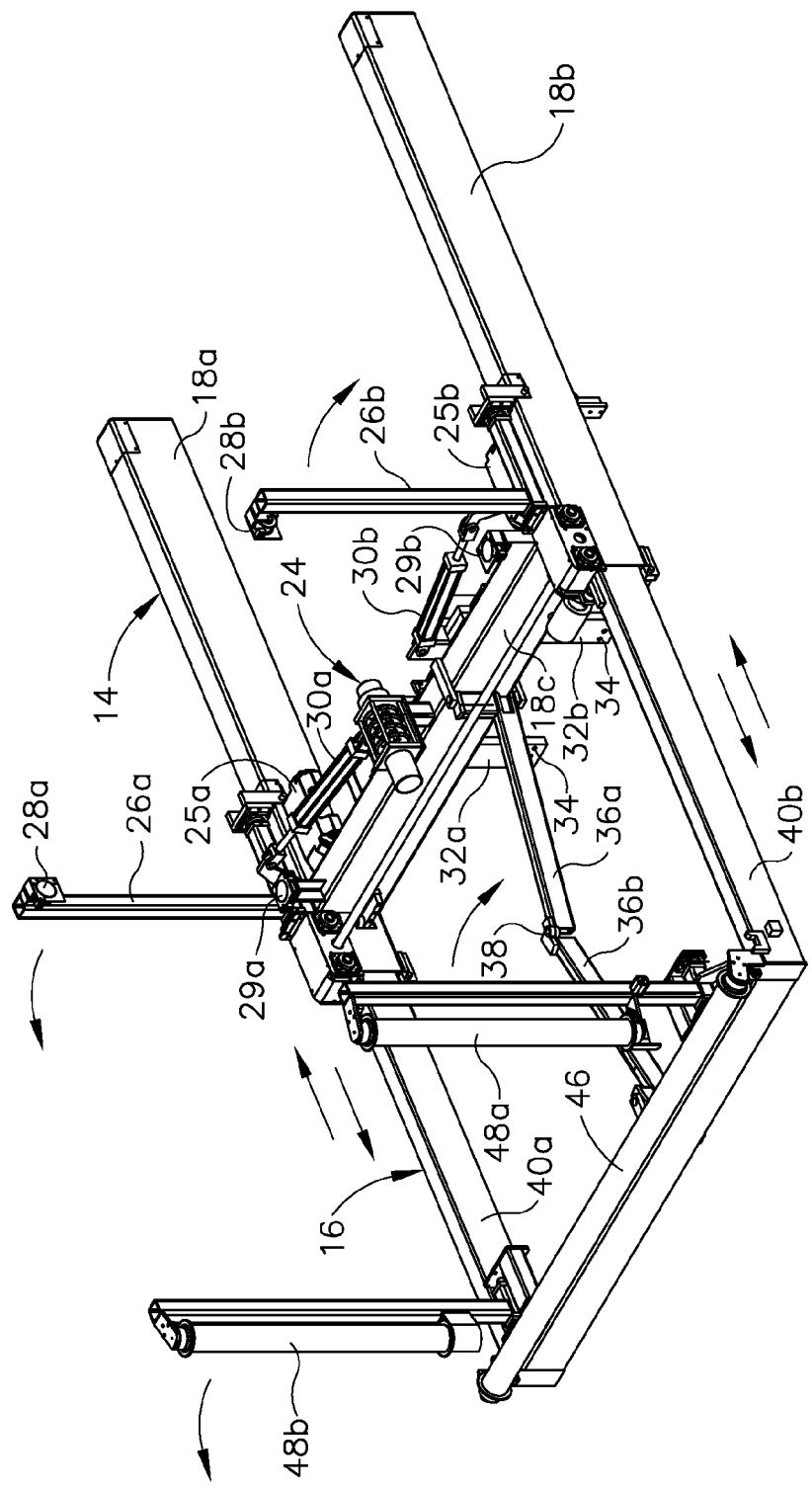
FIG. 3B is the top perspective view of the assembled system of FIG. 3A illustrating a first and second pairs of guide swing arms being in an upstanding position in accordance to the preferred embodiment of the invention.

FIG. 3A is an exploded perspective view of the mobile tarping system 10 without the forklift truck 12 and FIGS. 3A-3F are the perspective view of the assembled mobile tarping system 10 shown from various orientations in accordance to the preferred embodiment of the invention. In the present invention, the term "forklift" is used to refer to various types of transporting and lifting vehicles, and is not limited to the standard forklift used herein for illustrative purposes. The system 10 generally includes a tube frame assembly 14 having a telescoping frame 16 slidably attached thereto. The tube frame assembly 14 is configured in a manner that the telescoping frame 16 can be substantially concealed therein when the system 10 is not in operation. The tube frame assembly 14 is fabricated from any material suited to provide a rigid structure with a minimum weight, for example aluminum and/or carbon steel. In the illustrated embodiment, the tube frame assembly 14 includes two parallel spaced apart longitudinal tube bars 18a, 18b that are interconnected at their respective ends with a cross bar 18c. Several components are mounted on the tube frame assembly 10 which permit the operation of system 10 as will be described in much greater detail hereinafter. For example, the system 10 uses four lifting straps 20a, 20b, 20c, and 20d that are manually connected to or disconnected from the tarp/tarpaulin 22. The system 10 is equipped with a winch assembly 24 that engages with the four lifting straps 20a, 20b, 20c, and 20d to wrap a cargo or load 26 with the tarp/tarpaulin 22 as illustrated best in FIGS. 8A & 8B. The winch assembly 24 operates by two electric batteries 25a, 25b each of which is attached to the opposed sides of the tube frame assembly as shown in FIG. 3B. The winch assembly 24 is attached to the cross bar 18c of the tube frame assembly 14 as will be described in greater detail hereinafter. The tube frame assembly 14 includes a first pair of guide swing arms 26a, 26b each of which is attached to the respective longitudinal tube bar 18a, 18b. Each of the guide swing arms 26a, 26b swings outwardly with respect to the tube frame assembly 14 when the swing arms are in extended position and each of swing arms 26a, 26b stand upwardly when in folded position.

Figure 3C:
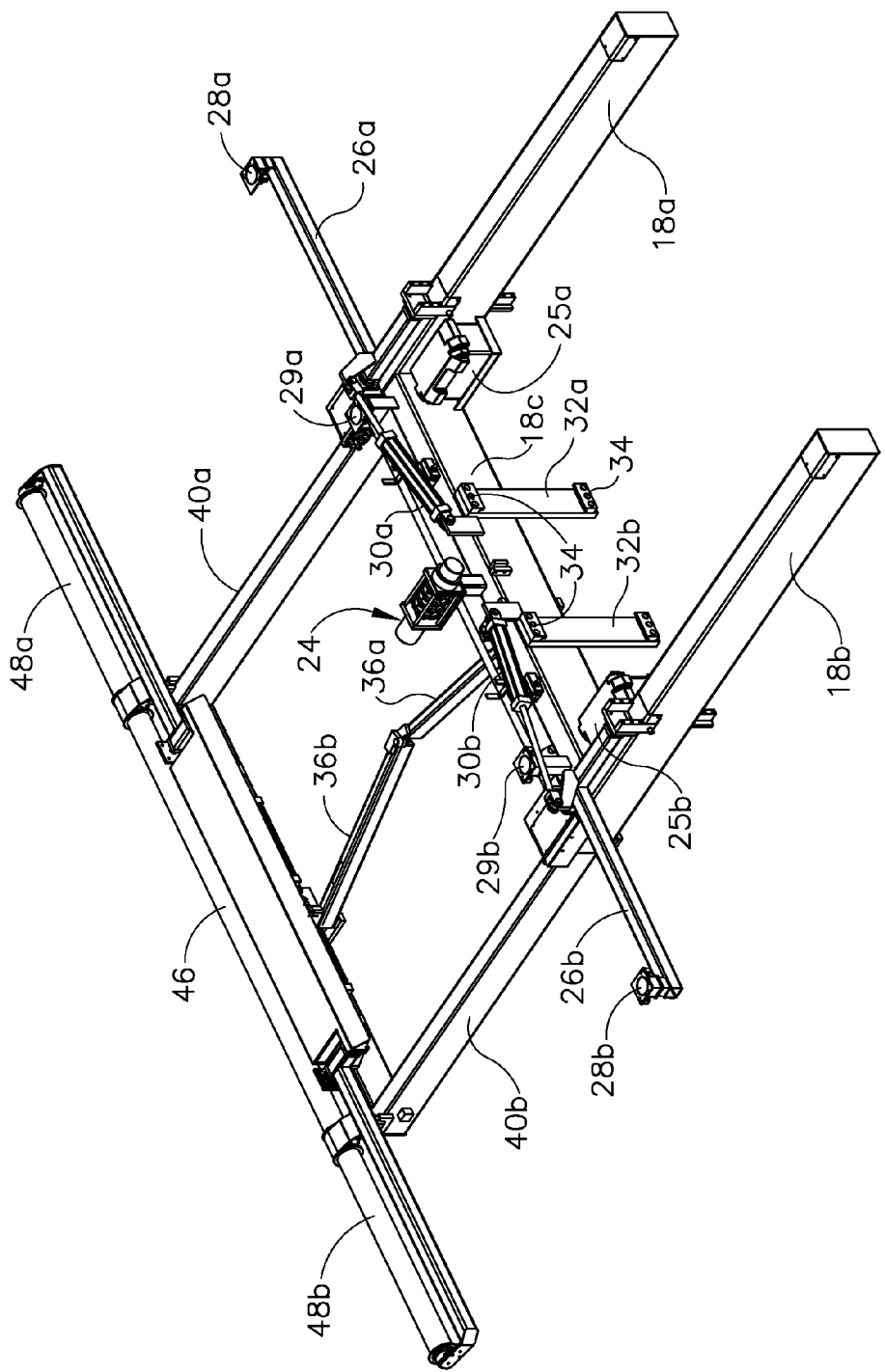
FIG. 3C is the rear and top perspective view of the assembled system of FIG. 3A.
Figure 3D:
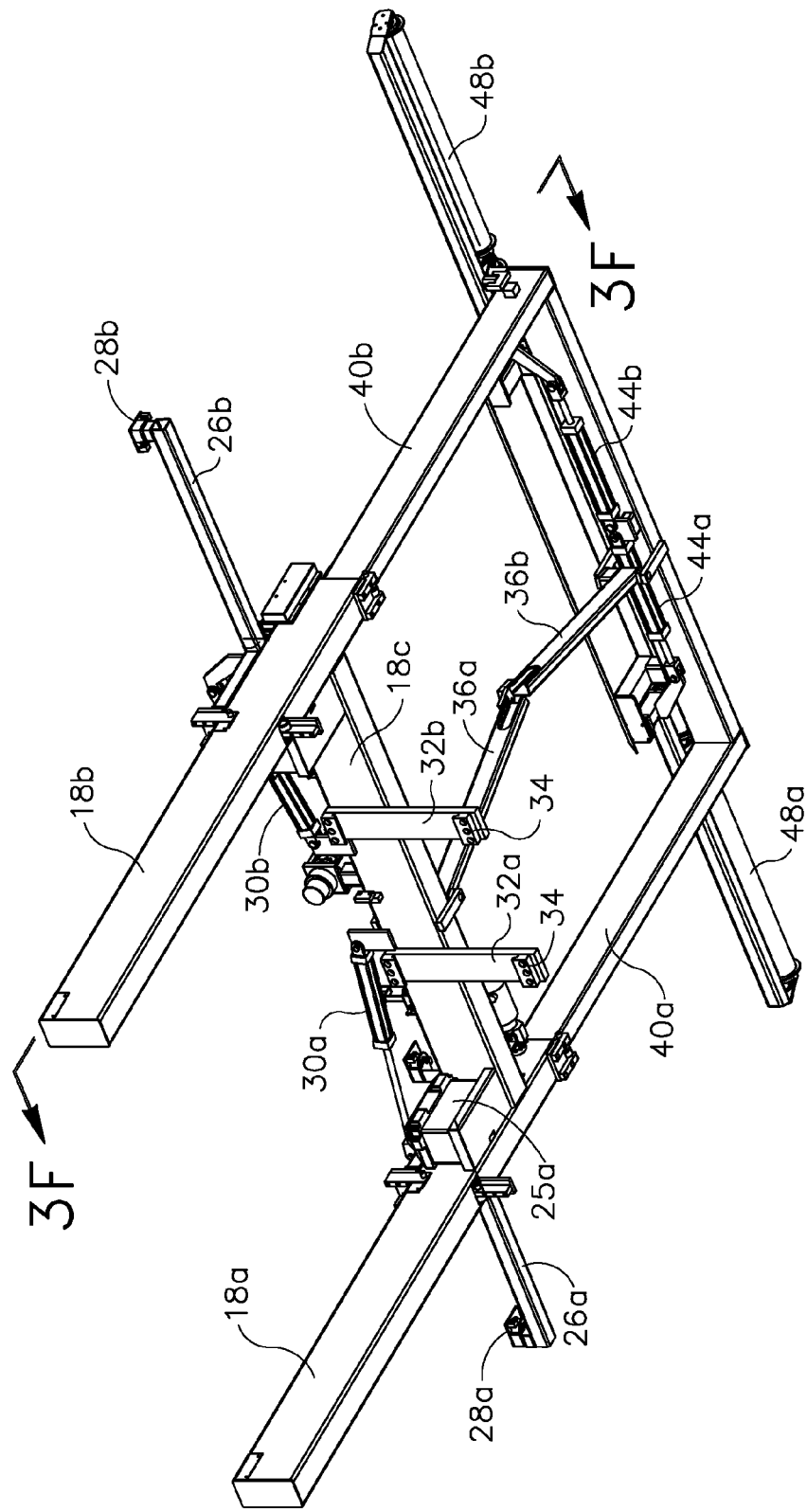
FIG. 3D is the rear and bottom perspective view of the assembled system shown in FIG. 3A.

There are two pairs of hydraulic cylinders, defined as a first pair of hydraulic cylinders 30a, 30b and a second pair of hydraulic cylinders 44a, 44b whereby the first pair hydraulic cylinders 30a, 30b are installed on the tube frame assembly 14. The second pair of hydraulic cylinders 44a, 44b are installed on the telescoping frame 16 as will be described hereinafter. Each of the respective first hydraulic cylinders 30a, 30b causes to swing the respective swing arms 26a, 26b during the operation of the system 10. One end of each respective hydraulic cylinder 30a, 30b is attached to the cross bar 18c and the respective opposite end is attached to the respective swing arms 26a, 26b. The two pairs of hydraulic cylinders 30a, 30b and 44a, 44b are driven by a hydraulic fluid pressure received via hydraulic fluid lines (not shown) which are respectively coupled to hydraulic power outlets typically provided by the forklift truck 12. Generally, a controller (not shown) is installed on the forklift truck 12 to control the hydraulic fluid flow through the hydraulic lines. It should be appreciated that the hydraulic drive system may be a self-contained system mounted on the system 10 itself, with only the controller being accessible to an operator of the forklift 12. However, most forklift trucks or other transporting and lifting vehicles typically include complete hydraulic power systems with suitable hydraulic power outlets, and therefore the provision of a completely self-contained hydraulic drive system to the system 10 would not be necessary in most applications. Each of the guide swing arms 26a and 26b comprises a first respective strap guide spool 28a, 28b each of which is attached at the respective distal ends of the swing arms that guides the respective straps 20a and 20d during the operation of the system 10. Similarly, a pair of strap guide spools 29a, 29b in which each of the pair is attached on the distal ends of the cross bar 18c and guides the respective lifting straps 20b and 20c during the operation of the system 10. The guide swing arms 26a and 26b and the strap guide spools 28a, 28b, 29a, 29b are fabricated from any material suited to provide a rigid structure with a minimum weight such as aluminum and/or carbon steel. The tube assembly 14 further includes a pair of mounting plates 32a, 32b that perpendicularly extending from the cross bar 18c and attached to a carriage 11 of the forklift truck 12 by any suitable means, for example, using bolts passing through holes 34 as best depicted in FIG. 3C.

The telescoping frame 16 is fabricated from any material suited to provide a rigid structure with a minimum weight, for example aluminum and/or carbon steel. In the illustrated embodiment, the telescoping frame 16 includes two parallel spaced apart longitudinal tube bars 40a, 40b that are interconnected at their respective ends with a cross bar 40c. The telescoping frame 16 is constructed so that it retracts and/or extends within the tube assembly frame 14 using a powertrain device 50 as seen best in FIG. 14 and will be discussed in greater detail. An inside extension arm 36a and outside extension arm 36b are configured to protect the hydraulic fluid hose lines that carries hydraulic fluid to the second pair of hydraulic cylinders 44a, 44b. The inside extension arm 36a and outside extension arm 36b are coupled together with an adjustable bolt 38 that permits the two arms 36a, 36b pivots with respect to one another as depicted in FIG. 3B. The inside extension arm 36a at one end is attached to the tube assembly 14 and at the opposite end is coupled to the outside extension arm 36b via adjustable bolt 38 as shown in FIG. 3A. Similarly, the outside extension arm 36b at one end is attached to the telescoping frame 16 and at the opposite end is coupled to the outside extension arm via adjustable bolt 38. The telescoping frame 16 includes a second pair of guide swing arms 42a, 42b each of which is attached to the respective longitudinal tube bar 40a, 40b. Each of the second pair guide swing arms 42a, 42b swings outwardly with respect to the telescoping frame 16 when the swing arms are in extended position and each of swing arms 42a, 42b stand upwardly when they are in upwardly folded position as depicted in FIG. 3A. It should be noted that each of first pair of guide swing arms 26a and 26b and each of the second pair of guide swing arms 42a, 42b are configured to be capable of independently swing with respect to one another. The second pair of hydraulic cylinders 44a and 44b are installed on the tube telescoping frame 16 wherein each of the respective hydraulic cylinder 44a, 44b causes to swing the respective second pair swing arms 42a, 42b during the operation of the system 10. The hydraulic cylinder 44a, 44b are protected by a guard 44, illustrated in FIG. 3 and are seen best in FIG. 10. One end of respective hydraulic cylinder 44a, 44b is attached to the cross bar 40c and the respective opposite end is attached to the respective second pair swing arms 42a, 42b. The hydraulic cylinders 44a, 44b are controlled by the forklift truck 12. As one of ordinary skill in the art would appreciate, the two pairs of hydraulic system 30a, 30b, 44a, 44b may alternatively be controlled wirelessly by the system 10 using off the shelf devices. The telescoping frame 16 further includes three rollers defined as a center roller 46 and two outer rollers 48a, 48b that are made of tubular steel or the likes. The center roller 46 is coupled to the cross bar 40c and each of the respective outer rollers 48a, 48b are coupled to each of the second pair guide swing arms 42a, 42b, respectively. The center roller 46 is longitudinally aligned with the cross bar 40c and the respective outer rollers 48a, 48b are longitudinally aligned with respective second pair guide swing arms 42a, 42b. The center roller 46 and the two outer rollers 48a, 48b are used to engage with the four lifting straps 20a, 20b, 20c, and 20c so as to facilitating and covering the cargo or load 26 with tarpaulin 22 during operation of the system 10. In the illustrated embodiment, the mobile tarp system 10 includes the powertrain device 50 (shown the detail in FIGS. 3E, 4, 5A, 5B) that permits linear movement (i.e., retraction and/or extension) of the telescoping frame 16 within the tube frame assembly 14 during operation of the system 10.

Figure 3E:
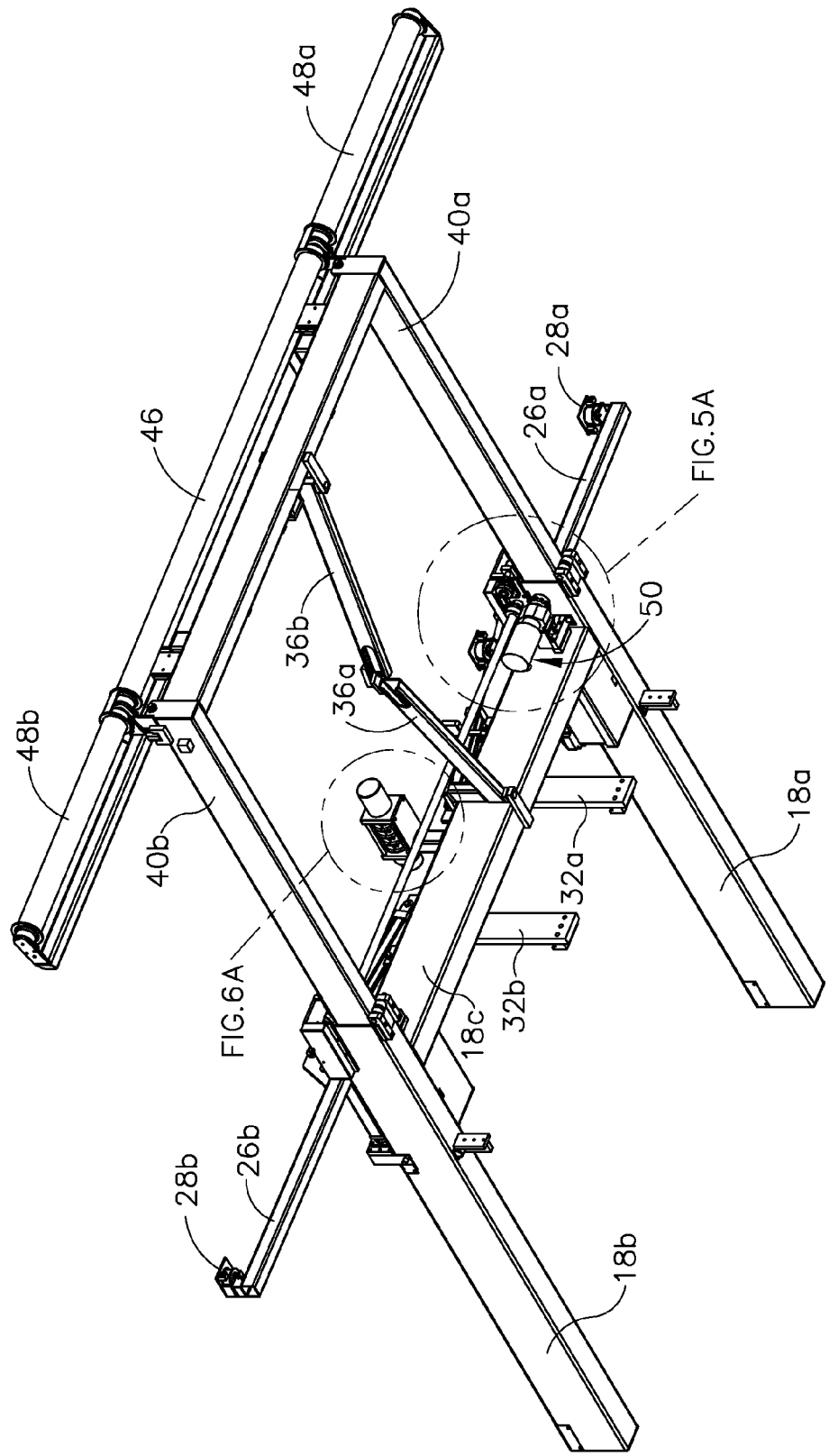
FIG. 3E is the front and bottom perspective view of the assembled system shown in FIG. 3A.
Figure 3F:
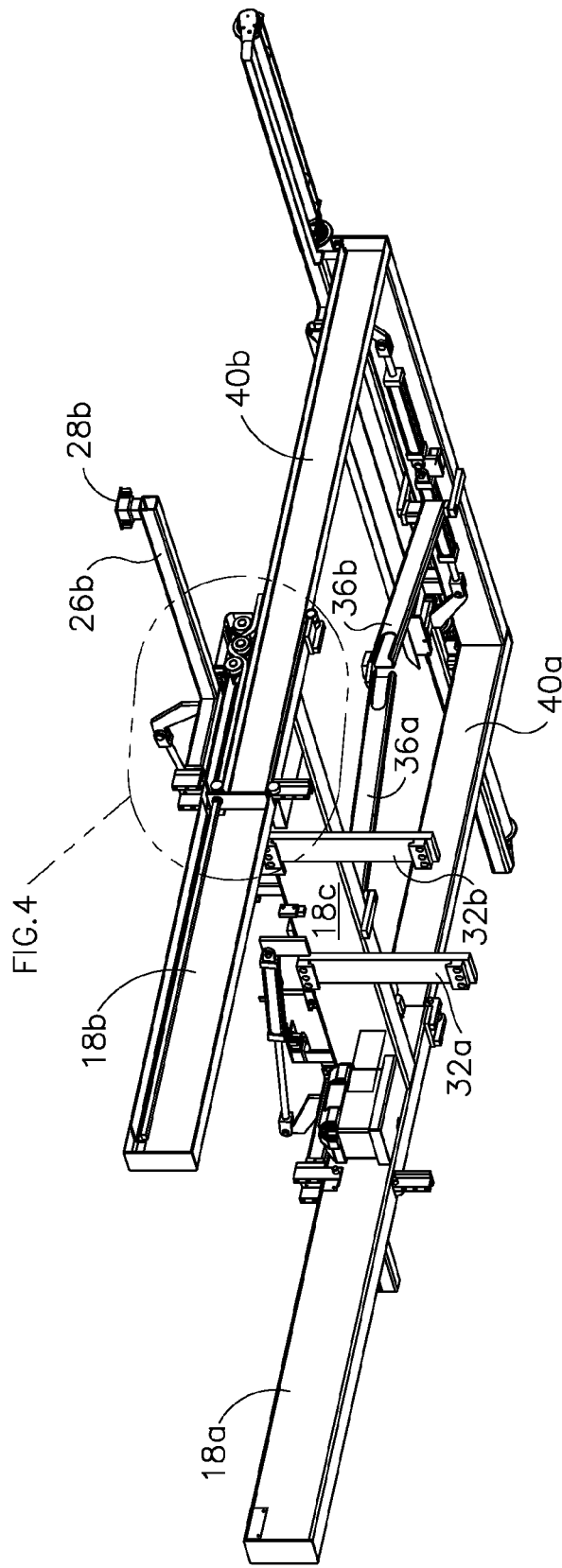
FIG. 3F is a partially open side perspective view of the assembled system shown in FIG. 3D.
Figure 4:
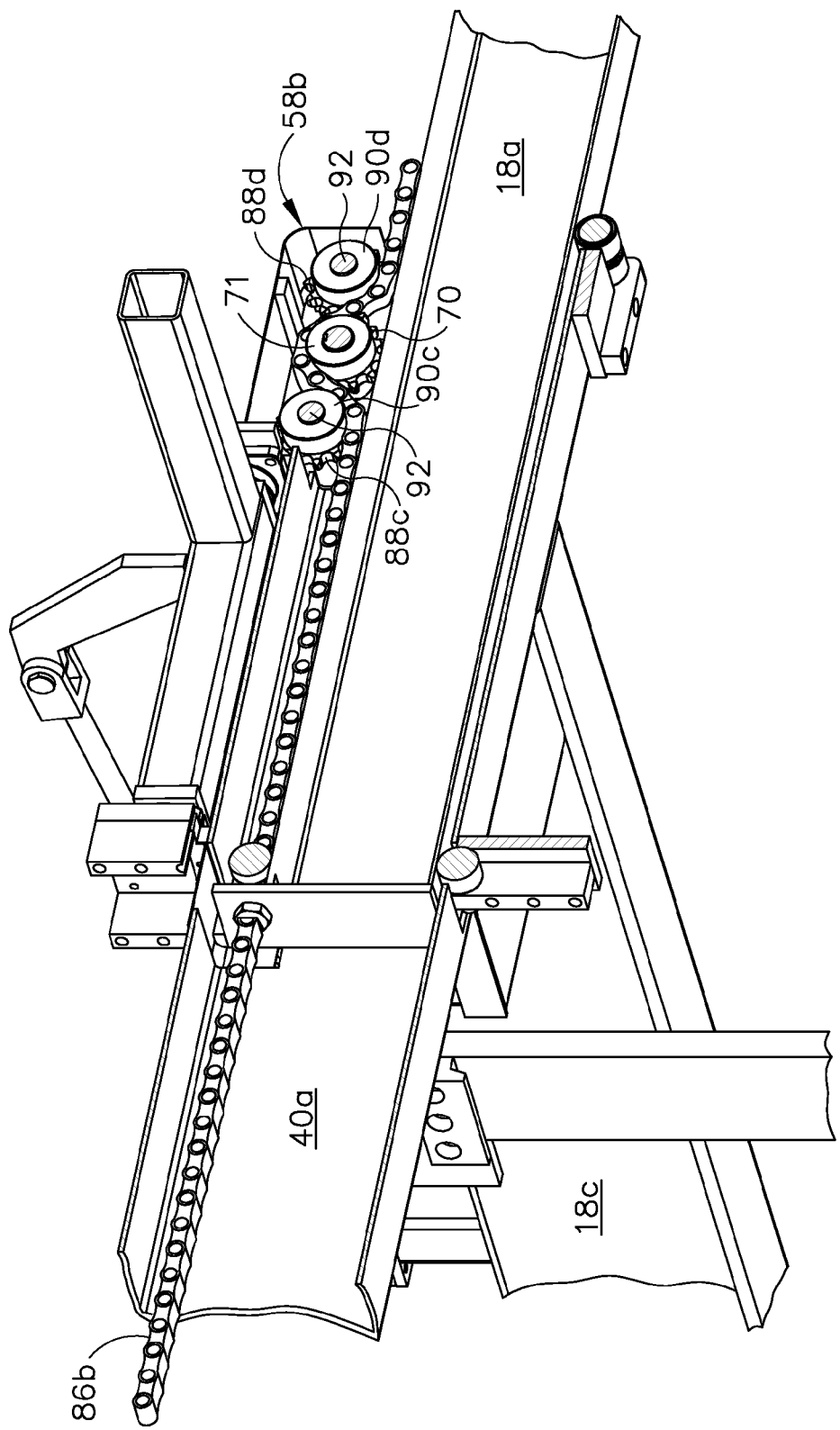
FIG. 4 is an enlarged view of a portion of FIG. 3F illustrating a portion of powertrain device which causes the telescoping frame to extend and/or retract.
Figure 5A:
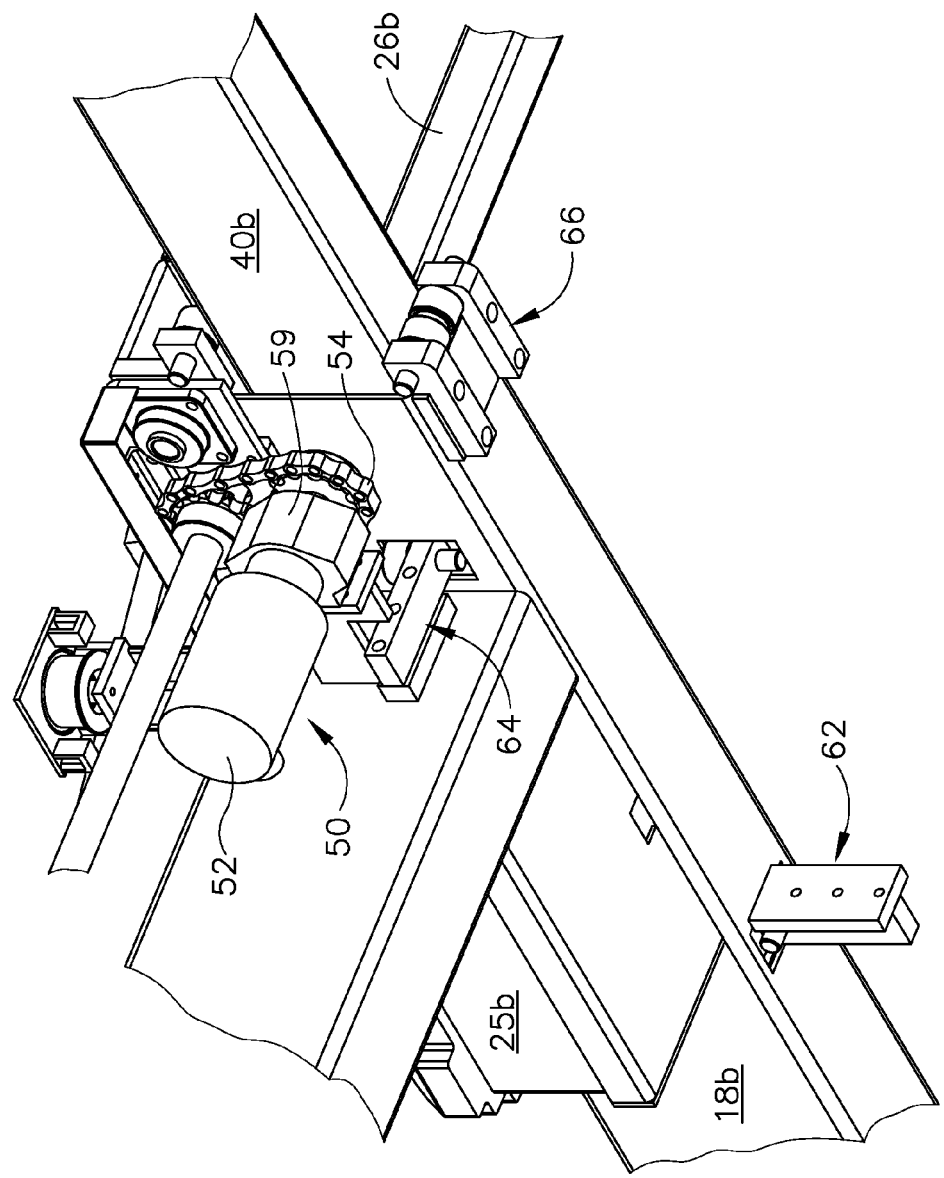
FIG. 5A is an enlarged view of a portion of FIG. 3E illustrating a bottom perspective view of the powertrain device in accordance to the preferred embodiment of the invention.
Figure 5B:
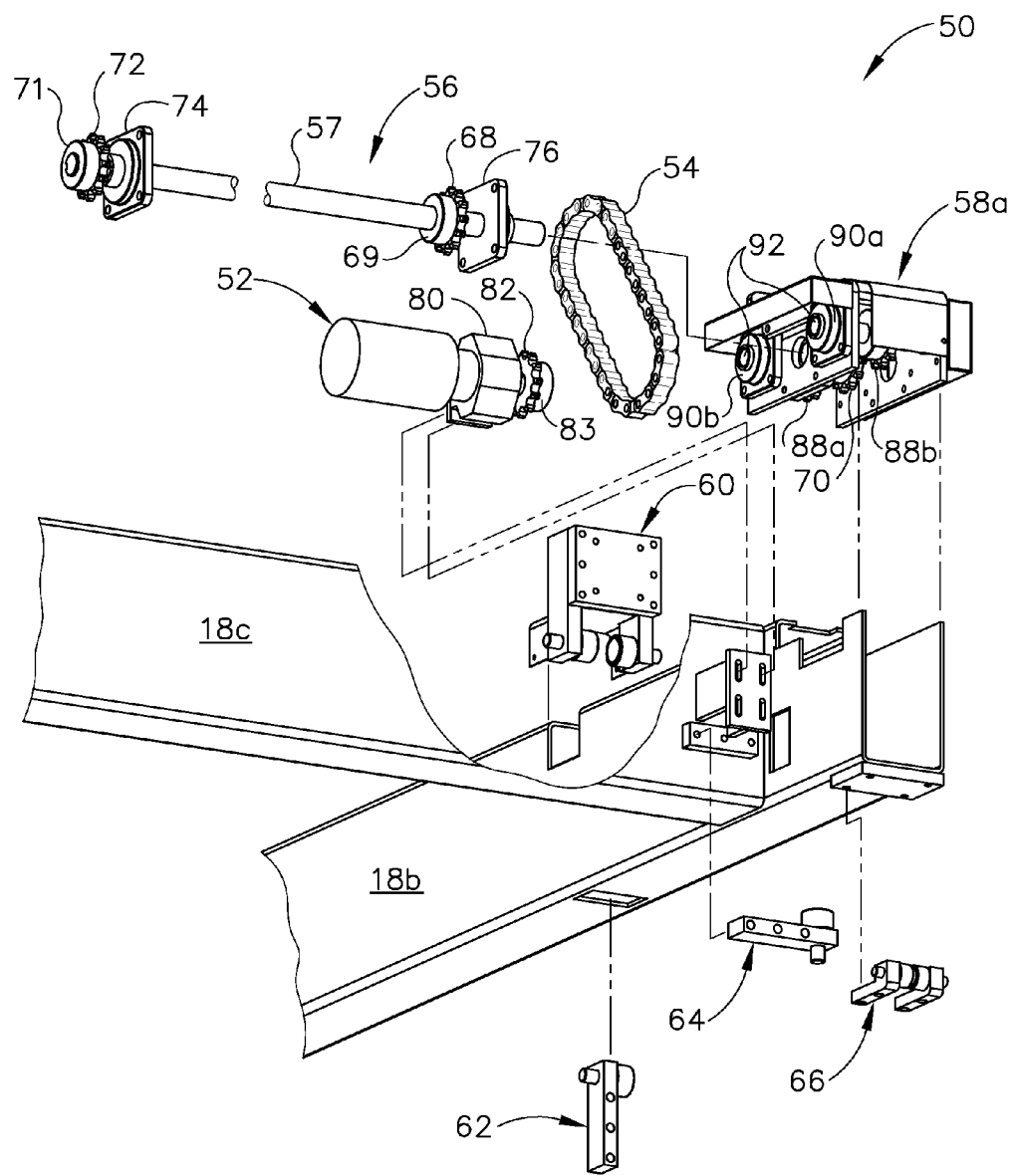
FIG. 5B is an exploded perspective view of the powertrain device shown in FIG. 5A illustrating various components of the power train device in spaced relationship with one another.

Referring now to FIG. 5A, which shows an enlarged bottom perspective view of the powertrain device 50 depicted in FIGS. 3A, 3B, 3E, with FIG. 5B being an exploded view of the various components which form the powertrain device of FIG. 5A in greater detail. The powertrain device 50 comprises a hydraulic motor assembly 52, a chain 54, a cross shaft assembly 56, two idler sprocket assemblies 58a (FIG. 5B), 58b (FIG. 4), a top cam follower guide 60, a bottom cam follower guide 62, a side cam follower guide 64, and a front cam follower guide 66 which are interconnect to one another to cause linear movement (i.e., retract and/or extend) of the telescoping frame 16 within the tube frame assembly 14 during operation of the system 10. The cross shaft assembly 56 includes a cross shaft 57, three shaft sprockets 68, 70, 72 and two cartridge flanges 74 and 76 which are connected to one another. At one end, the cross shaft 57 is coupled to the idler sprocket assembly 58a, via cartridge flange 76, and at the other end is coupled to the idler sprocket assembly 58b (FIG. 4), via cartridge flange 74, on opposite side of the tube frame assembly 14 and permits the idler sprocket assembly 58a and idler sprocket assembly 58b to be in sync with one another. At the respective opposed distal ends of the cross shaft 57 are the respective sprockets 70, 72 and the respective mounting bearing 77, 71 wherein the sprocket 70 and mounting bearing 77 are disposed inside the idler sprocket assembly 58a and the sprocket 72 and the mounting bearing 71 are disposed inside idler sprocket assembly 58b. On the other hand, the sprocket 68 and the mounting bearing 69 are disposed outside of the idler sprocket assembly 58a. The hydraulic motor 52 includes an over hung load adapter 80, a sprocket 82, and a mounting bearing 83 that is attached to the motor drive shaft (not shown). The over hung load adapter 80 generally permits easy adaptation of the electric motor to the gear reducer and the clutches which normally interface with hydraulic motor or adaptation of chain or belt and pulleys instead of direct plug in hydraulic motor. The two sprockets 68 and 82 are coupled with each other via the chain 54 so that the rotation of the motor drive shaft will cause the rotation of the cross shaft 57 in the same direction. Accordingly, the rotation of the cross shaft 57 causes the rotation of the two sprockets 70 and 72, having the respective linear chain 86a, 86b engaged thereto, to thereby move the telescoping frame 16 linearly within the tube frame assembly 14 during operation of the system 10. The sprockets 70, 72 and the linear chains 86a, 86b are contained in the respective idler sprocket assemblies 58a, 58b (FIGS. 4, 5B), and are thus protected from external elements. Each of the respective linear chains 86a, 86b engages with respective the tube assembly frame 14 and the telescoping frame 16. There are four pairs of mounting bearings 90a, 90b and 90c, 90d wherein the mounting bearing 90a, 90b are disposed on opposed sides of cross shaft 57 inside idler sprocket assemblies 58a and the mounting bearing 90c, 90d are disposed on opposed sides of cross shaft 57 inside idler sprocket assemblies 58b. Each pair of the mounting bearings 90a, 90b, 90c, and 90d includes a respective connecting rod 92 which coupled to the housing of the respective idler sprocket assemblies 58a, 58b. Each pair of the mounting bearings 90a, 90b, 90c, and 90d further includes a sprockets 88a, 88b, 88c, and 88d which are engaged with the linear chain 86a, 86b to cause the telescoping frame 16 moves linearly within the tube frame assembly 14. The top cam follower guide 60, the bottom cam follower guide 62, the side cam follower guide 64, and the front cam follower guide 66 are all attached to the respective longitudinal tube bar 18a and 18b on opposed side of the tube frame assembly 14 to guide the linear movement of the telescoping frame 16 during operation of system 10.

Figure 6A:
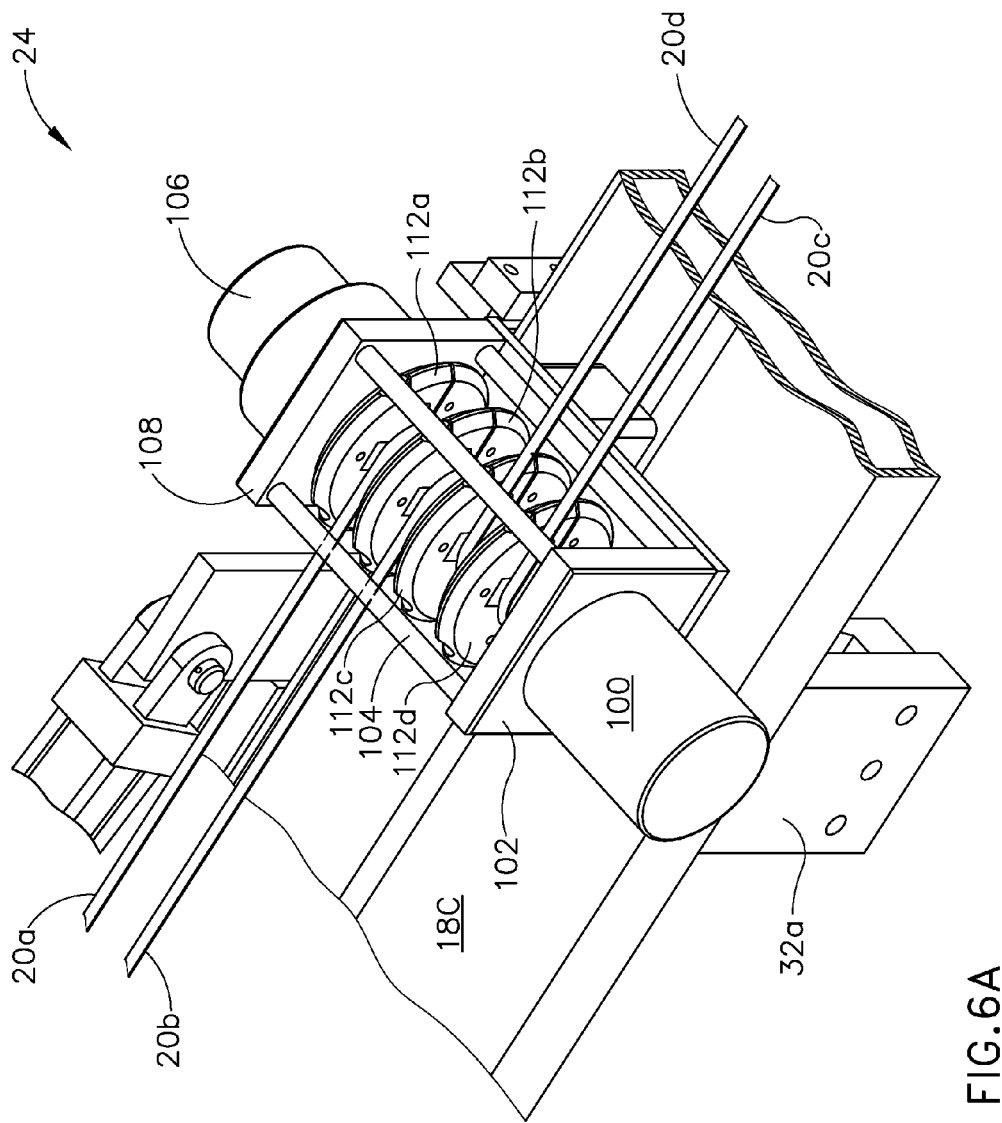
FIG. 6A is an enlarged view of a portion of FIG. 3E illustrating a top perspective view of a winch assembly in accordance to the preferred embodiment of the invention.
Figure 6B:
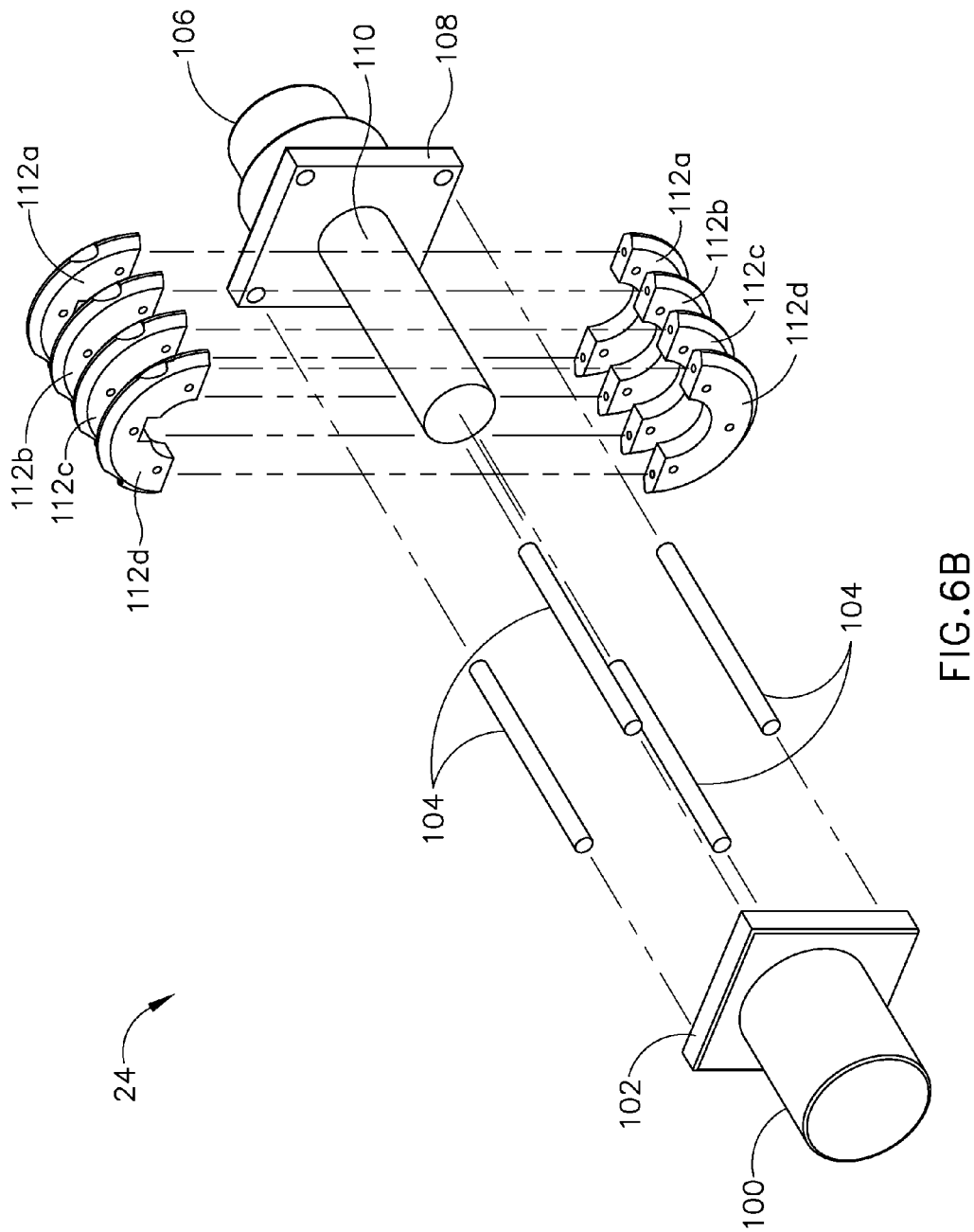
FIG. 6B is an exploded perspective view of the winch assembly shown in FIG. 5A illustrating various components of the winch assembly in spaced relationship with one another.

FIG. 6A is an enlarged view of the assembled winch assembly 24 shown in FIGS. 3A-3E and FIG. 6B is an exploded view of various components of the winch assembly 24 shown in FIG. 6A in accordance to the preferred embodiment of the invention. The winch assembly 24 is adaptably configured to engage with the four lifting straps 20a, 20b, 20c, and 20d to lift the tarp/tarpaulin 22 by automated means and to wrap the cargo or load 26 on a flat bed 25 of a truck. The winch assembly 24 includes a gear housing assembly 100, a gear mounting plate 102, four pin rods 104, a winch motor housing assembly 106, an end plate 108, a drum assembly 110, and four spacer plates 112a, 112b, 112c, and 112d in an unclamped spaced apart relationship with one another. The four spacer plates 112a, 112b, 112c, and 112d are clamped together around the drive shaft 110 as depicted in FIG. 6A. The gear housing assembly 100 contains the gear and clutch device therein and the winch motor housing 106 contains the electric motor contains therein. The drum assembly 110 rotates clockwise or counter-clockwise by the motor assembly and gear system. The four spacer plates 112a, 112b, 112c, and 112d are used to separate respective four lifting straps 20a, 20b, 20c, and 20d, as seen best in FIG. 6A. The four pins 104 are used to assemble the gear housing assembly 100 with the motor housing assembly 106 via mounting plate 102 and end plate 108. The drum assembly 110 is caged via four pins 104 therebetween the gear housing assembly 100 and the motor housing assembly 106.

Figure 7:
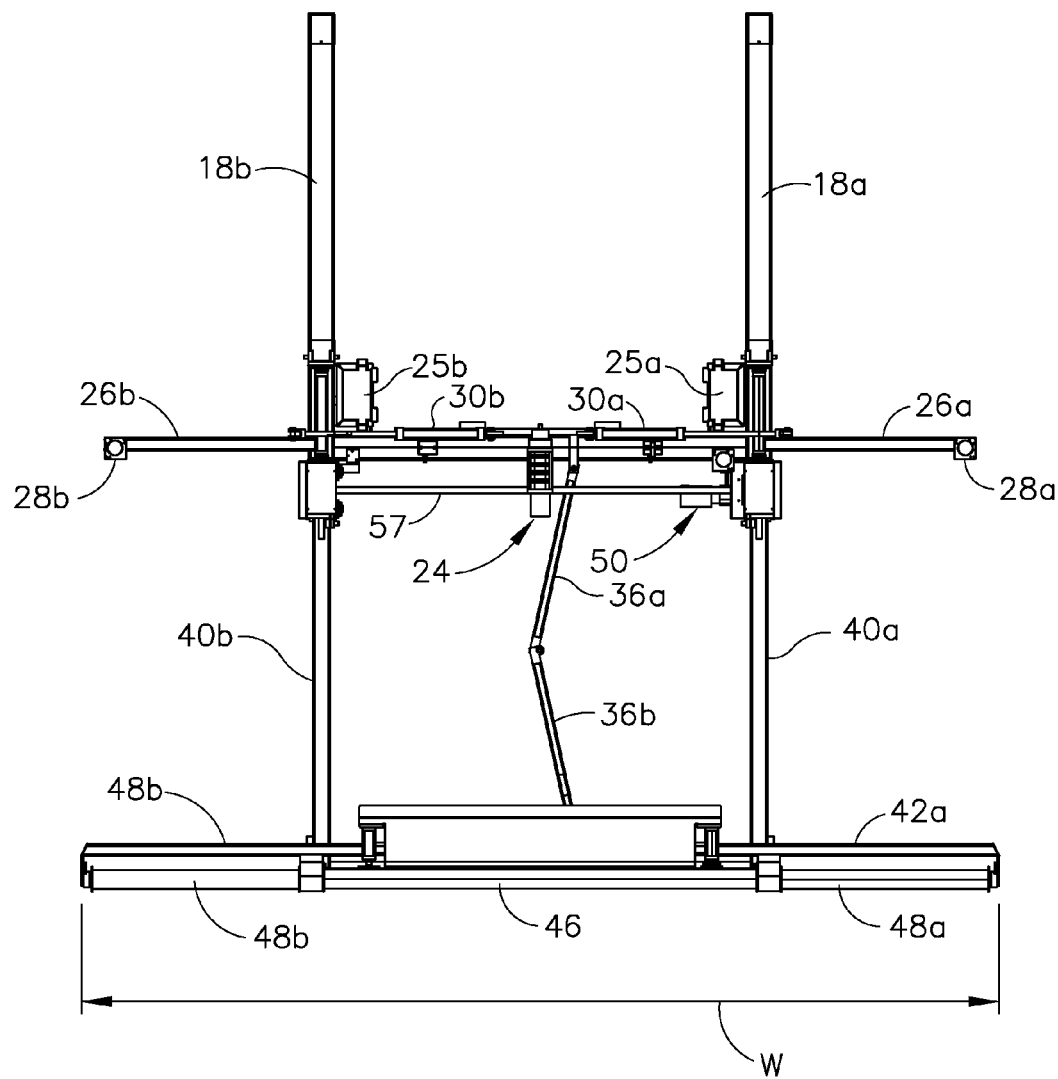
FIG. 7 is a top plan view of the system shown in FIGS. 1 and 2.

FIG. 7 is a top plan view of the system 10 shown in FIGS. 1 and 2. The mobile tarping system 10 operates with a width (w) that corresponds to the standard tarp width and is retractable to a much smaller foot print for ease of transportation and storage when not in use. As one of ordinary skill in the art would appreciate, the width (w) of system may be changed if non-standard tarp size is utilized. The process of tarping a load with this system can be easily and safely performed with one person due to the wireless remote capability of the winch assembly, if so equipped. However, in high volume tarping applications, the time to tarp a load can be significantly decreased by using a driver operator and an attendant who positions and connects the tarp to the straps on the device.

Figure 8A:
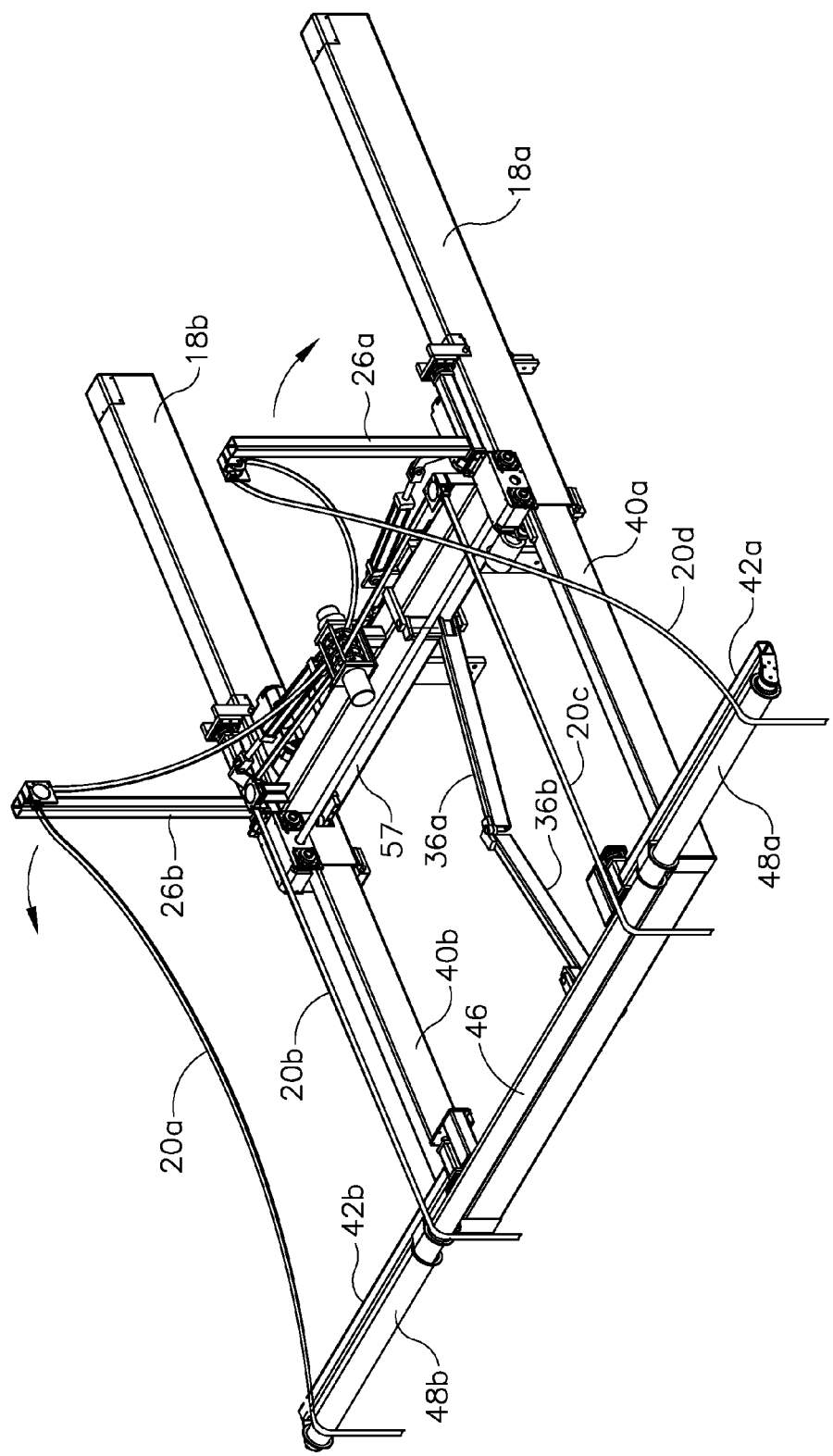
FIG. 8A is the perspective view of the assembled system of FIG. 3B illustrating four lifting straps attached thereto with the two swing arms of tube frame assembly in an upstanding folded position and the two swing arms of the telescoping frame in unfolded position.
Figure 8B:
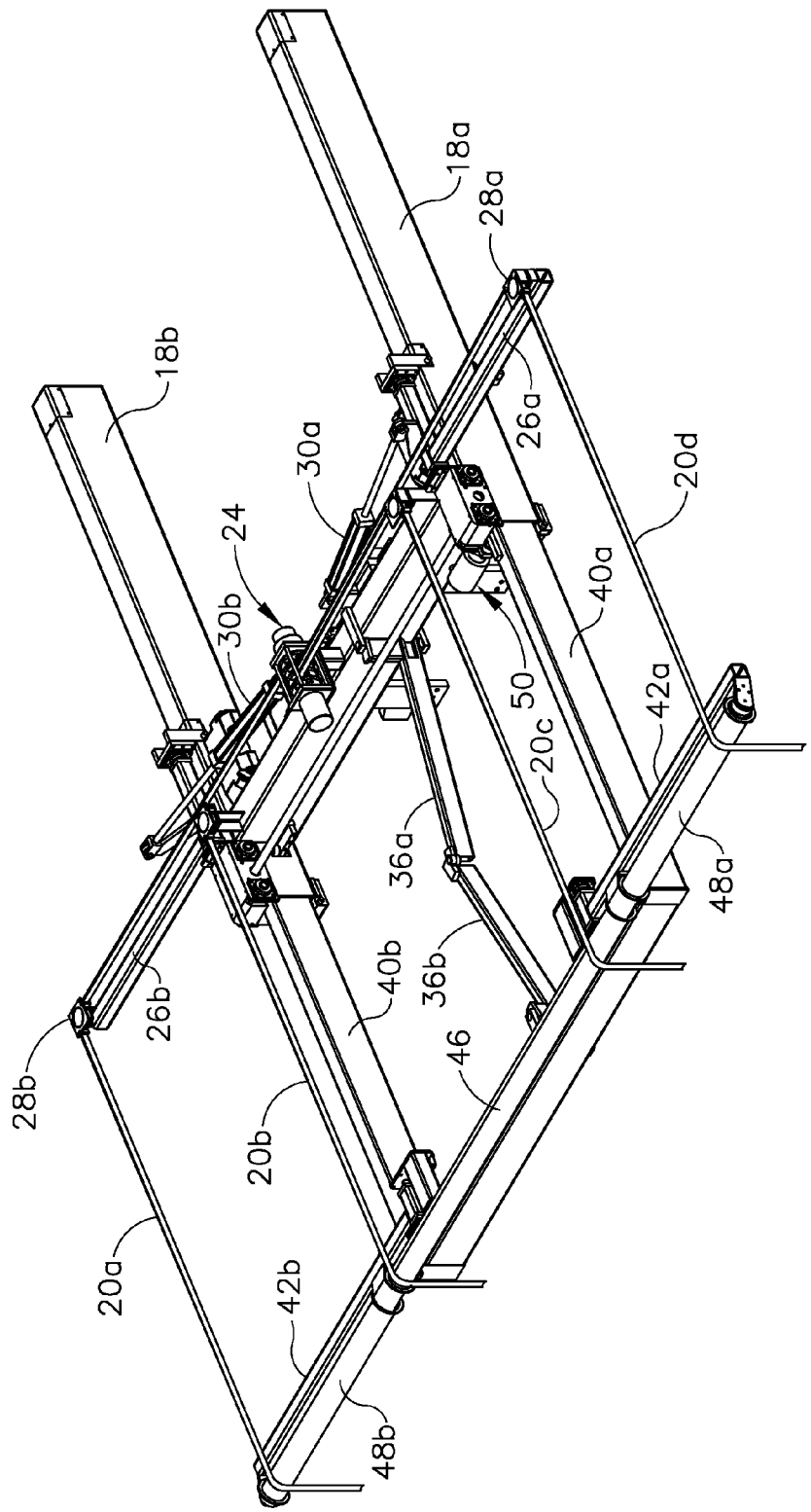
FIG. 8B is similar to FIG. 8A illustrating all four swing arms of the tube frame assembly and the telescoping frame are in unfolded position.
Figure 8C:
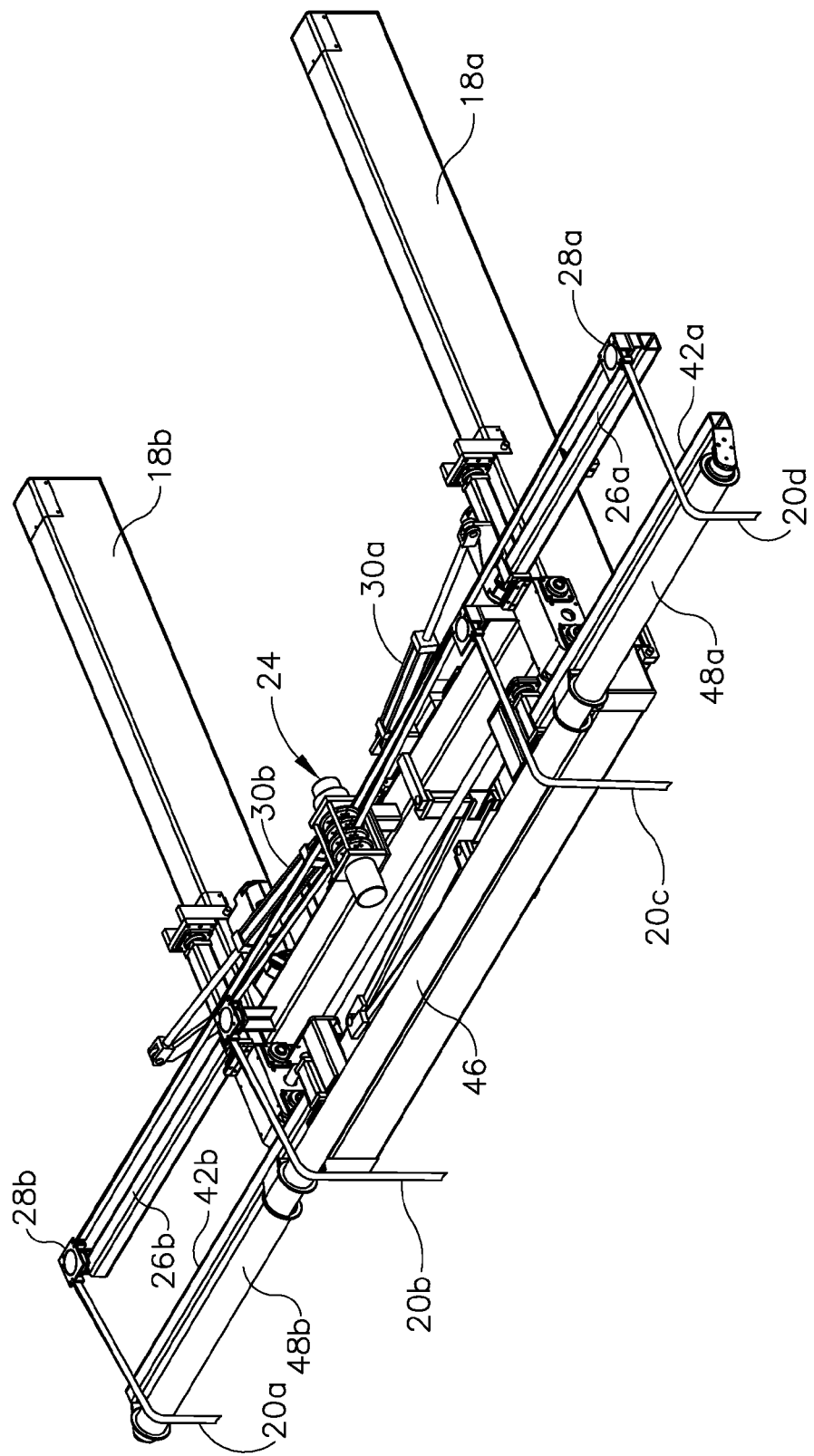
FIG. 8C is similar to FIG. 8B illustrating the telescoping frame in retracted position.
Figure 8D:
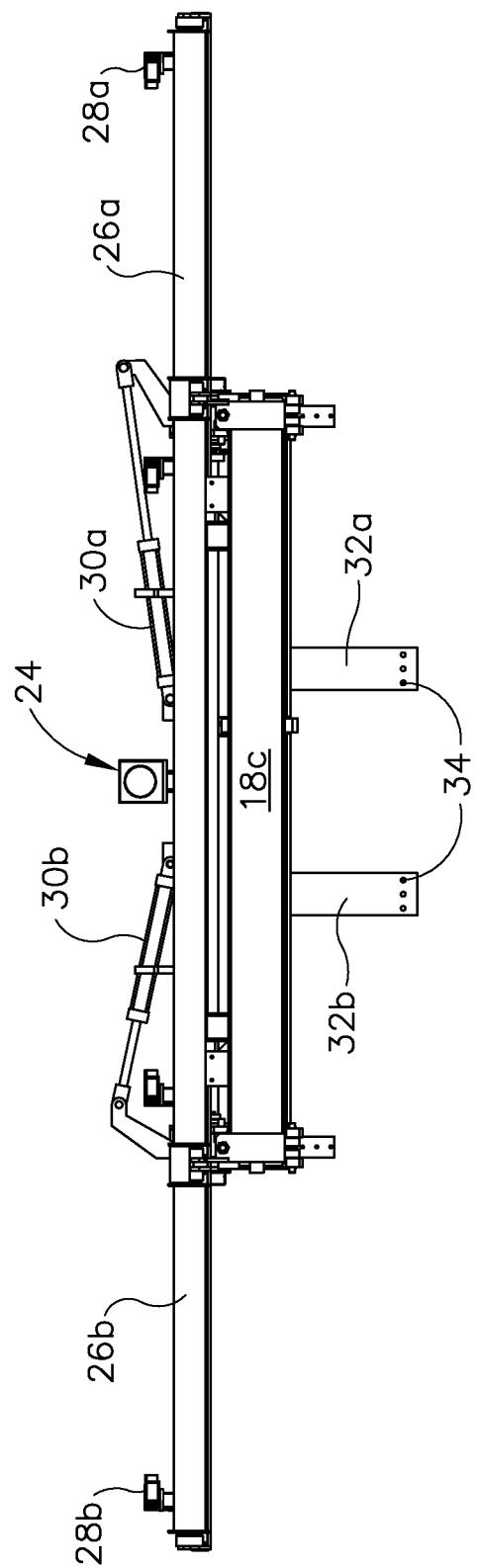
FIG. 8D is a front elevation view of the system of FIG. 3C.

FIG. 8A is the perspective view of the assembled system 10 of FIG. 3A illustrating four lifting straps 20a, 20b, 20c, and 20d attached thereto with the two swing arms 26a, 26b of tube frame assembly 14 in an upstanding folded position and the two swing arms 42a, 42b of the telescoping frame in unfolded position. The configuration and directions of the four lifting straps 20a, 20b, 20c, and 20d are illustrated to denote that two of the lifting straps 20a, 20b travel in one direction with respect to the winch assembly 24 and the other two lifting straps 20c and 20d travel in opposite direction with respect to the two of the lifting straps 20a, 20b. In operation, the two guide swing arms can be extended outwardly or sometimes telescoping frame 26 is retracted for ease of maneuvering the system to cover the cargo 26 with the tarpaulin 22 as best seen in FIGS. 8C and 8D. With the exception of the powertrain device 50 that is located on one side of the tube frame assembly 14, the mobile tarp system 10 is generally symmetric with respect to the longitudinal axis.

To use the mobile tarping system 10 for the purpose of draping a tarp/tarpaulin 22 or similar flexible cover over a load 26 placed on a flatbed truck 25 or on a railroad car, by way of two examples, to protect the load during transportation, first, the mobile tarping system 10 is mounted onto the forklift truck 12 as depicted in FIGS. 1 and 2. Once the telescoping frame assembly 16 is fully extended out and each of the four lifting straps 20a, 20b, 20c, and 20d are removably attached to the tarp/tarpaulin 22, then the winch assembly 24 is used to raise and store approximately ⅓ of the tarp/tarpaulin in a horizontal plane while the mobile tarp system 10 is positioned above the cargo or load. Next, the operator maneuvers the forklift truck 12 by moving away a bit from the flatbed of truck 12 while the system 10 is placing the tarp/tarpaulin 22 over the load 26 accordingly. Next, the four lifting straps 20a, 20b, 20c, and 20d are disengaged from the tarp/tarpaulin 22 and finally the edges of tarp/tarpaulin are securely hooked to the sides of the flat bed of a truck 25.

Figure 9A:
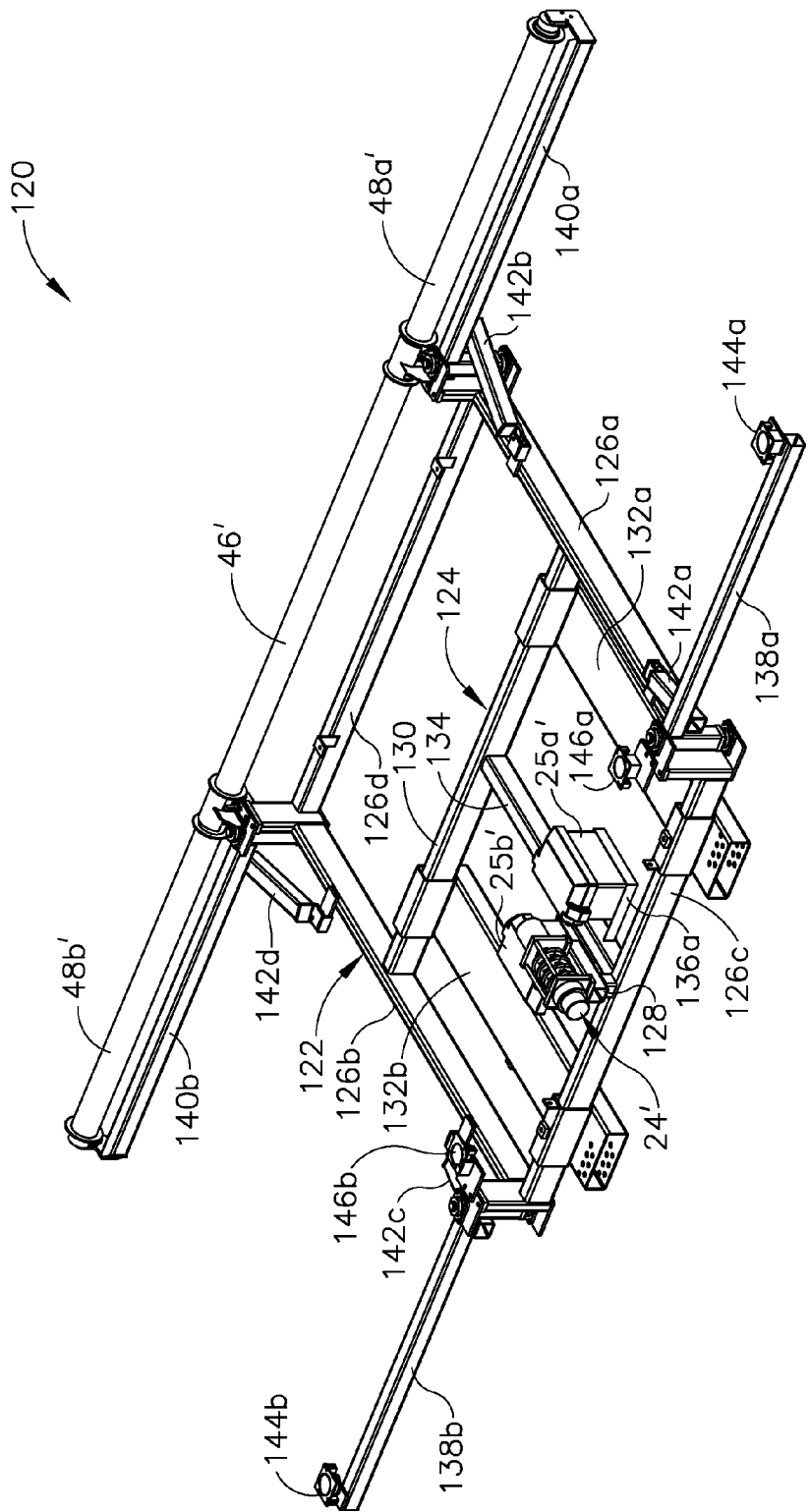
FIGS. 9A and 9B are respective rear and front perspective views of an alternative system in accordance to a second embodiment of the present invention.
Figure 9B:
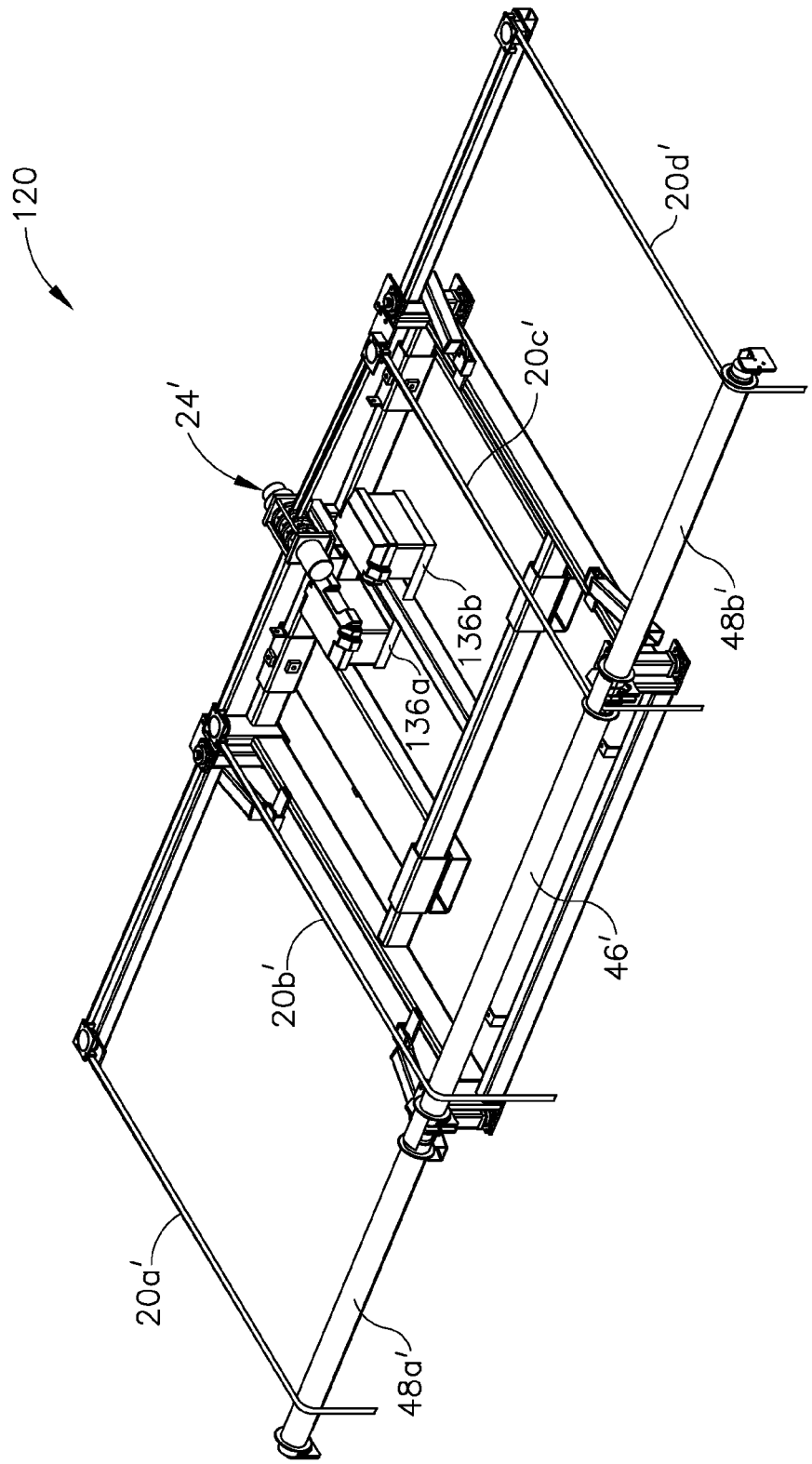

FIG. 9A is a rear perspective view of an alternative mobile tarping system 120 and FIG. 9B is a front perspective view of an alternative mobile tarping system 120 in accordance to a second embodiment of the present invention. The mobile tarping system 120 is mounted on a transporting and lifting vehicle, such as a forklift truck 12 (FIG. 1) used to cover a load 26 with a tarp/tarpaulin 22. The mobile tarping system 120 is constructed to raise and store approximately ⅓ of the tarp/tarpaulin 22 in a horizontal plane in order to minimize lifting requirements. Lifting height restrictions may be critical in many enclosed structures and may be of concern even in outside environment applications where prevailing winds could create lift truck stability issues. The mobile tarping system 120 can be easily modified, by the addition of stationary uprights, pedestal mounting or roller storage, to further reduce forklift truck lifting height restrictions if warranted. The system 120 uses four lifting straps 20a', 20b', 20c' and 20d', which are manually connected to from the tarp 22 as shown in FIG. 9B. Cables, ropes, mechanical swing arms, etc. could be used to hoist the tarp 22 and alternate connectors, instead of hooks, could be employed to connect the tarp to the system. Quick connect, remote operated connecting mechanisms are investigated that allow less operator involvement and reduce the time required to tarp the load 26. The system 120 can be used in any situation that requires freight to be placed on the flatbed trailer 25 and tarped for transportation. The system 120 is readily useable by existing facilities providing that the facilities have some type of mobile equipment (e.g., forklift) that is capable being fitted with this attachment.

The mobile tarping system 120 generally includes a tube frame assembly 122 having a tray frame 124 formed therein. The tube frame assembly 122 is configured in a manner that the tray frame 124 is sit inside the tube frame assembly 122. The tube frame assembly 122 and the tray frame 124 are fabricated from any material suited to provide a rigid structure with a minimum weight, for example aluminum and/or carbon steel. In the illustrated embodiment, the tube frame assembly 122 includes four spaced apart tubes bar 126a, 126b, 126c, 126d that are interconnected at their respective ends to form a substantially squarely shaped frame. The tray frame 124 is defined by a center tube bar 130, two longitudinal tube slots 132a, 132b, and a transverse tube bar 134. The transverse bar 134 is attached at one end to the center tube bar 130 and at the opposed end to the tube bar 126c. Respective ends of the center tube bar 130 are attached to the respective tube bars 126a, 126b. The respective longitudinal tube slots 132a, 132b are positioned spaced apart from one another and attached (i.e., bolt or welding) at one respective ends to the tube bar 126c and the other respective ends attached to the center tube bar 130. The longitudinal tube slots 132a, 132b and the transverse bar 134 are all parallel with one another. The respective longitudinal tube slots 132a, 132b are each sized to receive the forks of a conventional forklift truck. In the illustrated embodiment, the mobile taming system 120 can be lifted or maneuvered so as to place the tarp 22 on the load 26 of the flatbed trailer. The system 120 is equipped with a winch assembly 24' that engages with the four lifting straps 20a', 20b', 20c', and 20d to wrap a cargo or load 26 with the tarp/tarpaulin 22 as seen best in FIG. 9B. The winch assembly 24' is attached to the tube bar 126c via tube pad 128. The winch assembly 24' operates by two electric batteries 25a', 25b' each of which is attached to respective holding plates 136a, 136b. The holding plates 136a, 136b are securely attached to the transverse bar 134. The tube frame assembly 122 includes two pairs of guide swing arms 138a, 138b, 140a, 140b which the swing arms 138a, 140a are attached to the longitudinal tube bar 126a and the swing arms 138b, 140b are attached to the longitudinal tube bar 126b. Each of the two pairs of swing arms 138a, 138b, 140a, and 140b is attached at each respective corner of the squarely shaped frame 122.

Each of the guide swing arms 138a, 138b, 140a, and 140b swings outwardly with respect to the tube frame assembly 122 when the swing arms are in the extended position. The respective swing arms 138a, 140a and the respective swing arms 138b, 140b are aligned with respective the tube bars 126a, 126b in an overlapping relationship when they are in folded position. Each of the guide swing arms 138a, 138b, 140a, and 140b includes a respective linkage bar 142a, 142b, 142c, and 142d that is used to hold the respective swing arms 138a, 138b, 140a, and 140b in an extended locking position using a locking pin (not shown). Each of the guide swing arms 138a and 138b comprises a respective strap guide spool 144a, 144b each of which is attached at the respective distal ends of the swing arms 138a and 138b that guides the respective straps 20a' and 20d' during the operation of the system 120. Similarly, two strap guide spool 146a, 146b each of which is attached on respective ends of the 126a, 126b which guides the respective straps 20b' and 20c' during the operation of the system 120. The guide swing arms 138a and 138b and the strap guide spools 144a, 144b, 146a, 146b are fabricated from any material suited to provide a rigid structure with a minimum weight such as aluminum and/or carbon steel. The tube frame assembly 122 further includes three rollers defined as a center roller 46' and two outer rollers 48a', 48b' that are made of tubular steel or the likes. The center roller 46' is coupled to the tube bar 126d and each of the respective outer rollers 48a', 48b' are coupled to each of the second pair guide swing arms 140a, 140b, respectively. The center roller 46' is longitudinally aligned with the tube bar 126d and the respective outer rollers 48a', 48b' are longitudinally aligned with respective second pair guide swing arms 140a, 140b. The center roller 46' and the two outer rollers 48a', 48b' together are used to engage with the four lifting straps 20a', 20b', 20c', and 20d' to cover or uncover the load 26 with tarpaulin 22 during operation of the system 120.

In operation, each of the guide swing arms 138a, 138b, 140a, and 140b swings outwardly with respect to the tube frame assembly 122. Next, respective lifting straps 20a', 20d' are engaged with respective strap guide spools 144a, 144b and respective lifting straps 20c', 20b' are engaged with the strap guide spools 146a, 146b. Each of the respective lifting straps 20a', 20d' extends over the respective outer rollers 48a', 48b' and the respective lifting straps 20c', 20b' extends over the center roller which all the four lifting straps are hooked to the tarp 22. Using the winch assembly 24', the tarp is raised and store approximately ⅓ of the tarp/tarpaulin 22 in a horizontal plane in order to minimize lifting requirements and then while moving away the mobile tarp system 120 from the top of the load, tarp is wrapping the load simultaneously. Finally, the hooks at the edge of the tarp are attached to the sides of the flatbed trailer.

As will be appreciated by those skilled in the art, various modifications to the embodiment of the mobile tarping system 10 hereinabove described are possible. For example, the configuration of the tube frame assembly 14 or the telescoping frame 16 is not limited to the illustrated embodiment, and various other arrangements of components and/or subassemblies are possible to form the tube frame assembly or the telescoping frame, while meeting the strength requirements imposed in the use of the present invention. In particular, the arrangement for attaching the mobile tarping system 10 to the forklift is not limited to the construction based on the mounting plates 32a, 32b, as described above, and may include other means, such as a simple hook or channel into which system 10 is engaged with the forklift. Further, the center and outer rollers may be replaced with any other rotating elements, such as wheels or only a single roller may be used. As a further example, the center and outer rollers may define a plurality of ribs or gears on their circumferential surfaces to facilitate gripping of the tarp during the operation. Also, the location of the winch assembly 24 is not limited to center location of the tube frame assembly as illustrated. Instead, in some applications, the winch assembly 24 may be placed on the side longitudinal bars based on the configuration. Still further, the powertrain device is not limited to a hydraulic system and, for example, an electric or pneumatic powertrain device may also be used to controllably engage with the telescoping frame, especially when such system can be conveniently powered by a particular forklift used in a particular application. Finally, as described hereinabove, the mobile tarping system 10 is mounted on a movable lifting vehicle, such as forklift truck 12, however, the mobile tarping system 10 may alternatively be mounted on a fixed station for the operation.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A system mounted onto a movable lifting vehicle for wrapping and/or unwrapping a cargo with a flexible cover, the system comprising:

a tube frame assembly having a telescoping frame slidably attached thereto and having a variable foot print, the telescoping frame configured to be capable of being extendable and/or retractable within the tube frame assembly and wherein the tube frame assembly comprises a first pair of guide swing arms each of which is pivotably coupled on opposed sides of the tube frame assembly so as to change the foot print of the tube frame assembly when each of the guide swing arms being swung outwardly; and a winch assembly configured to be coupled to the tube frame assembly, the winch assembly having a plurality of flexible members engaged with the flexible cover to wrap and for unwrap the cargo.

2. The system of claim 1 wherein the telescoping frame comprises a plurality of rollers configured to be capable of rotating when engaged with the plurality of flexible members and the flexible cover.

3. The system of claim 2 wherein the plurality of rollers are defined by two identical outer rollers and a center roller wherein each of the rollers is coupled to the telescoping frame.

4. The system of claim 1 wherein each of the guide swing arms is engaged with the plurality of the flexible members.

5. The system of claim 1 wherein the telescoping frame comprises a second pair of guide swing arms each of which is pivotably coupled on opposed sides of the tube frame assembly and wherein each of the guide swing arms is engaged with the plurality of the flexible members.

6. The system of claim 5 wherein each of the second pair of guide swing arms is coupled with a respective hydraulic cylinder that causes to swing the guide swing arms with respect to the tube frame assembly and/or telescoping frame.

7. The system of claim 1 wherein the winch assembly comprises a self-contained wireless remote control that permits a user to operate the winch assembly.

8. The system of claim 1 wherein the winch assembly is electronically operated by the movable lifting vehicle.

9. The system of claim 1 wherein the winch assembly is electronically operated by at least one electric battery.

10. The system of claim 1 wherein the movable lifting vehicle is a forklift truck.

11. The system of claim 1 wherein the plurality of flexible members is selected from a group consisting of straps, cable, ropes and mechanical swing arms.

12. The system of claim 1 wherein each of the first pair of the guide swing arms includes a strap guide spool attached at respective free ends thereof to engage with the respective straps.

13. The system of claim 1 wherein the tube frame assembly includes a pair of mounting plates used to removeably attach the tube frame assembly to the forklift truck.

14. The system of claim 1 further comprising a powertrain device having a hydraulic motor assembly, a plurality of chains, a cross shaft assembly, two idler sprocket assemblies, a top cam follower guide, a bottom cam follower guide, a side cam follower guide, and a front cam follower guide which are interconnect to one another to cause the telescoping frame extend and/or retract within the tube frame assembly during operation of the system.

15. The system of claim 14 wherein the cross shaft assembly includes a cross shaft, three shaft sprockets and two cartridge flanges which are all connected to one another.

16. The system of claim 1 wherein the telescoping frame comprises respective inside and outside extension arms used to protect hydraulic fluid lines.

17. The system of claim 1 wherein the winch assembly includes a gear housing assembly, a gear mounting plate, four pin rods, a winch motor housing assembly, an end plate, a drum assembly, and four spacer plates which are interconnect to one another.

18. The system of claim 1 wherein the flexible cover is a tarp or tarpaulin.

19. A system mounted onto a forklift truck for covering and/or uncovering a cargo with a tarpaulin, the system comprising:

a tube frame assembly having a telescoping frame slidably attached thereto and having a variable foot print, the telescoping frame configured to be capable of being extendable and/or retractable within the tube frame assembly and wherein the tube frame assembly comprises a first pair of guide swing arms each of which is pivotably coupled on opposed sides of the tube frame assembly so as to change the foot print of the tube frame assembly when each of the guide swing arms being swung outwardly;

a powertrain device installed onto the tube frame assembly, for causing to retract and/or extend the telescoping frame within the tube frame assembly, and a winch assembly configured to be coupled to the tube frame assembly, the winch assembly having a plurality of straps engaged with the tarpaulin to cover and for uncover the cargo.

20. The system of claim 19 wherein each of the respective tube frame assembly and the telescoping frame define by respective two parallel spaced apart longitudinal tube bars that are interconnected at their respective ends with a respective cross bar.

21. The system of claim 19 wherein each of the guide swing arms is engaged with the plurality of straps.

22. The system of claim 19 wherein the telescoping frame comprises a second pair of guide swing arms each of which is pivotably coupled on opposed sides of the tube frame assembly, and wherein each of the guide swing arms is engaged with the plurality of straps.

23. The system of claim 22 wherein each of the second pair of the guide swing arms includes a strap guide spool attached at respective free ends thereof to engage with the respective straps.

24. The system of claim 22 wherein each of the second guide swing arms include a respective pair of hydraulic cylinders that causes to swing the guide swing arms with respect to the tube frame assembly and/or telescoping frame.

25. The system of claim 20 wherein the telescoping frame comprises one center roller and two identical outer rollers wherein the center roller is attached to the cross bar and each of the respective outer rollers is attached to the respective second pair of the guide swing arms.

26. The system of claim 19 wherein the winch assembly includes a gear housing assembly, a gear mounting plate, four pin rods, a winch motor housing assembly, an end plate, a drum assembly, and four spacer plates which are interconnect to one another.

27. The system of claim 19 wherein the plurality of straps define by four identical straps which are rotatably engaged with the winch assembly in a manner that two of the strap travel in one direction and the other two straps travel in opposite direction during operation of the system.

28. The system of claim 26 wherein the four spacer plates, are coupled to the drum assembly in spaced apart from one another in parallel manner and wherein each of the straps positioned between the four spacer plates.

29. The system of claim 22 wherein each of first pair of guide swing arms and each of the second pair of guide swing arms are configured to be capable of independently swing with respect to one another.

30. A system mounted onto a forklift truck for covering and/or uncovering a cargo with a tarpaulin, the system comprising:
- a tube frame assembly having a tray frame attached therein and having a variable foot print; and
- a plurality of guide swing arms each of which being pivotably coupled to the tube frame assembly and being outwardly extend from each corner of tube frame assembly, each of the plurality of guide swing arms configured to be capable of being extendable and/or retractable within the tube frame assembly to change the foot print the tube frame assembly, and
- a winch assembly configured to be coupled to the tube frame assembly, the winch assembly having a plurality of straps engaged with the tarpaulin to cover and/or uncover the cargo.

31. The system of claim 30 wherein tube frame assembly is defined by four spaced apart tubes bars that are interconnected at their respective ends to form a substantially squarely shaped tube frame.

32. The system of claim 30 wherein the tube frame assembly comprises two identical outer rollers and, a center roller wherein each of the two outer rollers is coupled to the respective two of the guide swing arms and the center roller is coupled to one of the four tube bar.

33. The system of claim 30 wherein the plurality of straps define by four identical straps which are rotatably engaged with the winch assembly in a manner that two of the straps travel in one direction and the other two straps travel in opposite direction during operation of the system.

34. A method of covering a cargo with a tarpaulin placed on a flatbed of a trailer using a forklift truck, the method comprising:
- mounting a system onto the fork lift truck for applying a tarpaulin over the cargo, the system comprising a tube frame assembly having a telescoping frame slidably attached thereto and having a variable foot print, the telescoping frame configured to be capable of being extendable and/or retractable within the tube frame assembly and wherein the tube frame assembly comprises a first pair of guide swing arms each of which is pivotably coupled on opposed sides of the tube frame assembly so as to change the foot print of the tube frame assembly when each of the guide swing arms being swung outwardly, a winch assembly configured to be coupled to the tube frame assembly, the winch assembly having a plurality of flexible members engaged with the flexible cover to wrap and/or unwrap the cargo;
- attaching the plurality of flexible members to the tarpaulin; and
- lifting the tarpaulin by maneuvering the system and placing the tarpaulin over the cargo.

35. The method of claim 34 wherein the step of mounting the system includes extending outwardly the telescoping frame from the tube frame assembly so that the plurality of flexible members are pulling up the tarpaulin and placing the tarpaulin over the cargo.

36. The method of claim 34 wherein the plurality of flexible members are four identical straps which are rotatably engaged with the winch assembly in a manner that two of the strap travel in one direction and the other two straps travel in opposite direction during operation of the system.

37. The method of claim 34 wherein each of the guide swing arms is engaged with the four identical straps.

38. The method of claim 34 wherein the telescoping frame comprises a second pair of guide swing arms each of which is pivotably coupled on opposed sides of the tube frame assembly and wherein each of the guide swing arms is engaged with the four identical straps.

* * * * *

UNITED STATES PATENT AND TRADEMARK OFFICE
CERTIFICATE OF CORRECTION

PATENT NO. : 8,820,717 B2
APPLICATION NO. : 13/661860
DATED : September 2, 2014
INVENTOR(S) : Gaylor Bruce Shrader et al.

It is certified that error appears in the above-identified patent and that said Letters Patent is hereby corrected as shown below:

In the Claims

Claim 1, Column 13 line 15:   "and for" should read -- and/or --.

Claim 19, Column 14 line 27:   "and for" should read -- and/or --.

Claim 19, Column 14 line 22:   the "," should be deleted.

Signed and Sealed this
Thirtieth Day of December, 2014

Michelle K. Lee
*Deputy Director of the United States Patent and Trademark Office*